US006424872B1

(12) United States Patent
Glanzer et al.

(10) Patent No.: US 6,424,872 B1
(45) Date of Patent: Jul. 23, 2002

(54) BLOCK ORIENTED CONTROL SYSTEM

(75) Inventors: David A. Glanzer, Georgetown; Terrance L. Blevins; Ram Ramachandran, both of Austin; Kenneth D. Krivoshein, Elgin, all of TX (US); Patricia E. Brett, Ft. Washington, PA (US); Jack Elias, Ft. Washington, PA (US); William R. Hodson, Fort Washington, PA (US); Frank Lynch, Fort Washington, PA (US); Ashok K. Gupta, Fairport, NY (US); Lee A. Neitzel, Sacramento, CA (US); Thomas B. Kinney, Foxboro, MA (US); Chuji Akiyama, Tokyo (JP); Yasuo Kumeda, Tokyo (JP); Hiroshi Mori, Tokyo (JP); Mitsugu Tanaka, Tokyo (JP)

(73) Assignee: Fieldbus Foundation, Austin, TX (US)

( * ) Notice: Subject to any disclaimer, the term of this patent is extended or adjusted under 35 U.S.C. 154(b) by 0 days.

(21) Appl. No.: 08/916,178

(22) Filed: Aug. 21, 1997

Related U.S. Application Data

(60) Provisional application No. 60/024,346, filed on Aug. 23, 1996.

(51) Int. Cl.[7] .............................................. G05B 11/01

(52) U.S. Cl. .............................. 700/18; 700/17; 700/4; 700/83; 700/86; 709/224; 709/227; 709/230; 709/201; 710/15; 710/72; 710/105; 714/10; 714/11

(58) Field of Search .......................... 700/24–37, 2–4, 700/7, 12–19, 79, 83–87, 28, 32; 702/122, 182, 186; 710/75, 62–72, 105, 109, 21; 709/223–224, 225–227, 315–336, 321, 233, 245, 230, 217, 250, 201; 719/9–13

(56) References Cited

U.S. PATENT DOCUMENTS

| RE27,703 E | 7/1973 | Stafford et al. ........... 340/172.5 |
| 4,074,565 A | 2/1978 | Harris et al. ................... 73/778 |
| 4,283,634 A * | 8/1981 | Yannone et al. ............ 700/287 |

(List continued on next page.)

FOREIGN PATENT DOCUMENTS

| WO | WO 99/48245 | 9/1999 |

OTHER PUBLICATIONS

File History: Peer–to–Peer Register Exchange Controller for Industrial Programmable Controllers; U.S. Patent No. 4,992,926, Application Serial No. 07/258,779, Feb. 12, 1991; Janke et al., filed Oct. 17, 1988.

(List continued on next page.)

Primary Examiner—Ramesh Patel
(74) Attorney, Agent, or Firm—Dorsey & Whitney LLP

(57) ABSTRACT

The present invention is a block oriented control system that allows interoperability between devices made by different manufacturers. A block oriented control system is a system which includes a plurality of field devices incorporating a physical layer, communication stack, and user layer, with the field devices being connected by a transmission medium, such as a bus. The physical layer receives signals from the bus and translates the signals into a message for the communications stack, and receives messages from the communications stack and translates the messages into signals for the bus. The communication stack controls the communications between devices operating in the control system. The user layer is a block oriented approach to the system's control functions, and includes function blocks and system management. The function blocks are standardized encapsulations of control functions, such as analog input or proportional/derivative. The system management allows synchronization of the device applications and the network processing.

45 Claims, 12 Drawing Sheets

U.S. PATENT DOCUMENTS

| | | | |
|---|---|---|---|
| 4,347,563 A | 8/1982 | Paredes et al. | 700/8 |
| 4,430,699 A | 2/1984 | Segarra et al. | 709/230 |
| 4,484,273 A | 11/1984 | Stiffler et al. | 710/110 |
| 4,531,193 A | 7/1985 | Yasuhara et al. | 364/551 |
| 4,591,977 A | 5/1986 | Nissen et al. | 709/226 |
| 4,819,149 A | 4/1989 | Sanik et al. | 700/7 |
| 4,831,558 A | 5/1989 | Shoup et al. | 702/188 |
| 4,864,489 A | 9/1989 | Yasuhara et al. | 364/131 |
| 4,888,726 A | 12/1989 | Struger et al. | 709/201 |
| 4,938,068 A | 7/1990 | Clements | 73/704 |
| 4,969,083 A | 11/1990 | Gates | 700/18 |
| 4,992,926 A | 2/1991 | Janke et al. | 709/225 |
| 5,115,675 A | 5/1992 | Feldman et al. | 73/704 |
| 5,122,794 A | 6/1992 | Warrior | 340/825.2 |
| 5,131,092 A | 7/1992 | Sackmann et al. | 709/207 |
| 5,151,978 A | 9/1992 | Bronikowski et al. | 709/216 |
| 5,159,673 A | 10/1992 | Sackmann et al. | 709/216 |
| 5,166,678 A | 11/1992 | Warrior | 340/870.15 |
| 5,245,704 A | 9/1993 | Weber et al. | 709/215 |
| 5,251,302 A | 10/1993 | Weigl et al. | 710/263 |
| 5,329,579 A | 7/1994 | Brunson | 379/88 |
| 5,333,114 A | 7/1994 | Warior et al. | 364/550 |
| 5,434,774 A | 7/1995 | Seberger | 364/172 |
| 5,448,231 A | 9/1995 | Takezoe et al. | 340/870.39 |
| 5,451,923 A | 9/1995 | Seberger et al. | 340/310.006 |
| 5,452,201 A | 9/1995 | Pieronek et al. | 700/83 |
| 5,453,924 A | 9/1995 | Monson et al. | 700/2 |
| 5,457,999 A | 10/1995 | Feldman | 73/704 |
| 5,485,142 A | 1/1996 | Stute et al. | 340/506 |
| 5,485,400 A | 1/1996 | Warrior et al. | 364/550 |
| 5,513,324 A * | 4/1996 | Dolin, Jr. et al. | 709/237 |
| 5,526,358 A | 6/1996 | Gregerson et al. | 709/24 |
| 5,537,547 A | 7/1996 | Chan et al. | 709/230 |
| 5,537,626 A | 7/1996 | Kraslavsky et al. | 710/8 |
| 5,546,584 A | 8/1996 | Lundin et al. | 709/315 |
| 5,553,297 A | 9/1996 | Yonezawa et al. | 700/18 |
| 5,579,482 A * | 11/1996 | Einkauf et al. | 709/220 |
| 5,682,476 A | 10/1997 | Tapperson et al. | 395/200.05 |
| 5,684,451 A | 11/1997 | Seberger et al. | 340/310.06 |
| 5,691,896 A | 11/1997 | Zou et al. | 364/157 |
| 5,706,007 A | 1/1998 | Fragnito et al. | 341/155 |
| 5,754,596 A | 5/1998 | Baschoff et al. | 375/295 |
| 5,764,891 A | 6/1998 | Warrior | 395/200.2 |
| 5,768,119 A | 6/1998 | Havekost et al. | 364/133 |
| 5,793,963 A | 8/1998 | Tapperson et al. | 395/200.31 |
| 5,796,602 A | 8/1998 | Wellan et al. | 364/130 |
| 5,796,721 A | 8/1998 | Gretta, Jr. | 370/245 |
| 5,801,942 A | 9/1998 | Nixon et al. | 364/188 |
| 5,805,442 A | 9/1998 | Crater et al. | 700/9 |
| 5,825,664 A | 10/1998 | Warrior et al. | 364/550 |
| 5,828,851 A * | 10/1998 | Nixon et al. | 700/19 |
| 5,834,861 A | 11/1998 | Kanzaki et al. | 307/125 |
| 5,841,654 A | 11/1998 | Verissimo et al. | 364/188 |
| 5,850,523 A | 12/1998 | Gretta, Jr. | 395/200.54 |
| 5,854,890 A | 12/1998 | Ramachandran et al. | 395/187.01 |
| 5,862,052 A | 1/1999 | Nixon et al. | 364/468.24 |
| 5,881,311 A * | 3/1999 | Woods | 710/2 |
| 5,889,817 A | 3/1999 | Yoshida | 375/220 |
| 5,903,455 A | 5/1999 | Sharpe, Jr. et al. | 364/188 |
| 5,909,368 A | 6/1999 | Nixon et al. | 364/131 |
| RE36,263 E | 8/1999 | Janke et al. | 700/5 |
| 5,960,214 A * | 9/1999 | Sharpe, Jr. et al. | 700/28 |
| 5,963,147 A | 10/1999 | Westfield et al. | 340/870 |
| 5,970,430 A | 10/1999 | Burns et al. | 702/122 |
| 5,975,737 A | 11/1999 | Crater et al. | 700/9 |
| 5,978,578 A * | 11/1999 | Azarya et al. | 700/2 |
| 5,978,850 A | 11/1999 | Ramachandran et al. | 709/228 |
| 5,980,078 A | 11/1999 | Krivoshein et al. | 364/131 |
| 5,982,362 A | 11/1999 | Crater et al. | 345/719 |
| 5,995,916 A | 11/1999 | Nixon et al. | 702/182 |
| 6,014,612 A | 1/2000 | Larson et al. | 702/183 |
| 6,017,143 A | 1/2000 | Eryurek et al. | 364/148 |
| 6,026,352 A * | 2/2000 | Burns et al. | 702/182 |
| 6,032,208 A * | 2/2000 | Nixon et al. | 710/64 |
| 6,044,305 A * | 3/2000 | Larson et al. | 700/87 |
| 6,047,220 A | 4/2000 | Eryurek | 700/28 |
| 6,047,222 A * | 4/2000 | Burns et al. | 700/79 |
| 6,061,603 A | 5/2000 | Papadopoulos et al. | 700/83 |
| 6,078,320 A | 6/2000 | Dove et al. | 345/333 |
| 6,094,600 A | 7/2000 | Sharpe, Jr. et al. | 700/19 |
| 6,095,674 A | 8/2000 | Verissimo et al. | 364/188 |
| 6,098,116 A | 8/2000 | Nixon et al. | 710/8 |
| 6,119,047 A | 9/2000 | Eryurek et al. | 700/28 |
| 6,151,625 A | 11/2000 | Swales et al. | 709/218 |
| 2001/0003804 A1 | 6/2001 | Papadopoulos et al. | 700/83 |

OTHER PUBLICATIONS

File History: Distributed Interface Architecture for Programmable Industrial Control Systems; U.S. Patent No. 5,805,442, Application Serial No. 08/655,469, Sep. 8, 1998; Crater et al., filed May 30, 19.

File History: Distributed Interface Architecture for Programmable Industrial Control Systems; U.S. Patent No. 5,975,737, Application Serial No. 09/112,583, Nov. 2, 1999; Crater et al., filed Jul. 9, 1998.

Disclosure Statement of Invention by Inventor, Patricia Brett.

* cited by examiner

BLOCK ORIENTED CONTROL SYSTEM

CROSS-REFERENCE TO RELATED APPLICATION

This application claims the benefit of U.S. Provisional Application No. 60/024,346 filed Aug. 23, 1996, which is hereby incorporated by reference.

BACKGROUND

Control systems are becoming increasingly important in all sectors of industry, such as process control, flexible manufacturing operations, total quality initiatives, assembly lines, machine tool controls, computer systems, and robotics. One of the strongest movements in the development of control systems is the movement toward "open" systems.

An "open" system is a system designed to provide interoperability between devices made by different vendors. Interoperability is the ability of field devices made by different vendors to communicate and work together. The movement toward open systems was initiated in the 1970s and early 1980s with the development of the Open System Interconnect (OSI) network model. The OSI network model is a seven layer network architecture, including a physical layer, data link layer, network layer, transport layer, session layer, presentation layer, and application layer.

However, the OSI network model, and other existing network models, are insufficient to provide interoperability. Today, devices made by different manufacturers usually cannot communicate without bridging technologies, such as gateways and translators. For example, in U.S. Pat. No. 5,526,358, issued Jun. 11, 1996, communication between field devices using a different transport protocol stack requires a dynamic context bridge. Thus, what is needed is a system which offers interoperability with devices made by different vendors.

The movement toward open systems is driven by vendors and users. Vendors want open systems because open systems would allow them to sell their product to more users, instead of only to the users operating a specific proprietary system. Users want open systems so that they can use the best field devices in their systems, not only the field devices specifically designed for a proprietary system Two common network control method are: "token passing" and "master for a moment." With the "token passing" system, any device with a ready message may, upon receiving a control token, send a message to another devices. A token passing control system is disclosed in U.S. Pat. No. 4,888,726, issued Dec. 19, 1989. With the "master for a moment" system, each device is adapted to accept and then relinquish supervisory control of the bus. Specifically, once a field device assumes supervisory control, the field device sends data or status requests to other field devices. When the field device is finished sending data and status requests, the field device forwards supervisory control to another device. A "master for a moment" system is disclosed in U.S. Pat. No. 4,347,563, issued Aug. 31, 1982.

There also has been a trend toward distributed control systems. Distributed control systems are an alternative to central control systems. In central control systems, a central controller performs all the control functions. In distributed control systems, more than one field device operating in the system takes an active role in the control functions.

However, the current distributed control systems do not synchronize application processes within the field devices with the network processing. As a result, these systems commonly experience "jitter." "Jitter" is when an application process does not occur at its scheduled time according to the network processing. Thus, what is needed is a system capable of synchronizing the application processes with the network processing.

What is needed is a control system that provides greater manufacturing flexibility, increased productivity, higher product quality, and improved operator and plant safety.

What is needed is a distributed control system that supports high speed applications and remote I/O.

What is needed is a distributed process control system that detects and reports its own errors, alerting operators to problems on a "real-time" basis.

What is needed is a distributed control system with synchronized applications processing and network processing.

SUMMARY OF THE INVENTION

The present invention overcomes the shortcomings described above and provides a new and improved block oriented control system. The present invention is a system for distributing the control within process control systems having intelligent field devices capable of data processing and management. The intelligent field devices are usually connected by a bus, which is a digital, serial, two-way communication system. A field device is any type of equipment used to remotely collect data or provide a response in a process control system, such as sensors, actuators, and motors. A field device is intelligent if it incorporates a program interface comprising three main functional components: 1) a physical layer; 2) a communication stack; and 3) a user layer. These layers are derived from the Open Systems Interconnect (OSI) model. To incorporate these layers, a field device generally includes a processor, memory, and medium attachment unit, such as a network adapter.

The physical layer is the same as OSI layer 1. The physical layer of the device receives messages from the communications stack and converts the message into physical signals on a transmission medium and visa-versa. The transmission medium could be a bus or two-way wiring. The physical layer is defined by approved standards from the International Electrotechnical Commission (IEC) and the International Society of Measurement and Control (ISA).

The communication stack generally comprises a data link layer, a fieldbus message specification, a fieldbus access sublayer and a network management layer. These layers correspond to OSI layers 2 and 7. The data link layer (DLL) is the same as OSI layer 2. The data link layer controls transmission of messages onto the bus based on the commands from a Link Active Scheduler (LAS). The link active scheduler is the intelligent field device which is assigned the responsibility of acting as a network controller. Other intelligent field devices capable of assuming the responsibility of the central controller, but not actually assigned the responsibility, are called Link Master Devices.

The fieldbus message specification and the fieldbus access sublayer are sublayers within OSI layer 7. The fieldbus message specification provides a standardized way for the user layers to communicate over a bus. Specifically, the fieldbus message specification describes the communication services (e.g., read, write, abort, etc.), message formats, and protocol behavior to build messages for the function block applications, and contains an object dictionary. The object dictionary contains descriptions of all the parameters available in that field device. The description of these parameters may be written in a variety of computer languages, such as C++ or Smalltalk, but preferably it is written in the Device Description Language.

The fieldbus access sublayer maps the fieldbus message specification to the data link layer, and thus, provides the needed functionality of OSI layers 3–6. The network management coordinates configuring the communications stack, performance monitoring, and fault detection monitoring.

The distributed control system is implemented by the user layer. The user layer includes 1) function blocks (FBs) and 2) system management. The function blocks are standardized encapsulations or blocks of control functions, such as analog inputs and outputs, discrete inputs and outputs, proportional/derivative control and proportional/integral/derivative control. In the preferred embodiment, there are ten standard function blocks for basic control and an nineteen standard function blocks for advanced control. Together, these twenty-nine standard function blocks provide most of the functionality required to build a field device for a manufacturing or process control system. For example, a temperature transmitter may contain an analog input function block, and a control valve may contain a proportional/integral/derivative function block and an analog output block. A complete control loop can be built using only a sensor and a valve since these devices contain an analog input, a proportional/integral/derivative, and analog output function blocks.

To coordinate the execution of the function blocks, the field device should also include system management. The system management provides the time synchronization for scheduled execution of function blocks while the link active scheduler schedules communication of function block parameters on the bus. System management also handles other system features such as broadcast of universal time throughout the system and automatic device address assignment.

It is an object of the present invention to provide greater manufacturing flexibility, increased productivity, higher product quality, and improved operator safety.

It is an object of the present invention to support high speed applications and remote I/O.

It is an object of the present invention to report its own errors, alerting operators to problems on a "real-time" basis.

BRIEF DESCRIPTION OF THE DRAWINGS

The foregoing objects and advantages of the present invention, together with other benefits and advantages which may be attained by its use, will become more apparent upon reading the following detailed description of the invention taken in conjunction with the drawings.

In the drawings, reference numerals identify corresponding portions of the system.

DETAILED DESCRIPTION OF THE PREFERRED EMBODIMENT

The present invention is an open control system with enhanced interoperability and improved distributed control. The control system can support a variety of standard field devices, including sensors and actuators, or high speed field devices, such as cell control, motors, drives and remote input/output (I/O).

Figure 1:
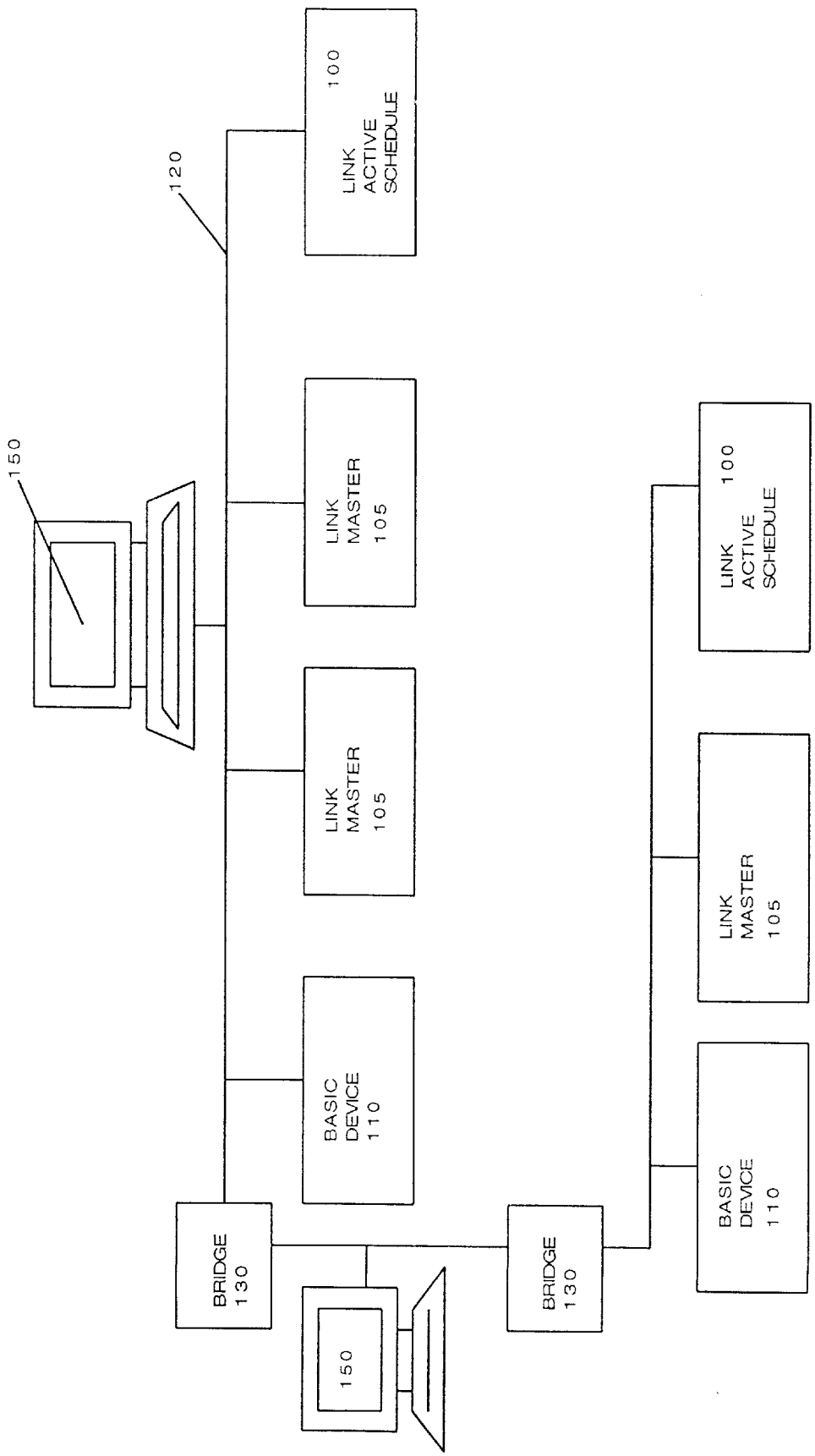
FIG. 1 is an overview of an extended control system.

As shown in FIG. 1, a field device operating on the control system is generally categorized as a link active scheduler 100, a link master 105, or a basic device 110. How a field device is categorized depends on its control capabilities and responsibilities. For example, a field device is categorized as a link active scheduler 100 if it is acting as network controller of a bus 120. A field device is categorized as a link master 105 if is capable of acting as the network controller or link active scheduler, but has not assumed that responsibility. A basic device 110 is not capable of acting as the network controller.

The field devices are electronically coupled or connected by a transmission medium 120, which can be individual input and output wires or a variety of bus configurations. As shown in FIG. 1, the preferred embodiment uses a bus configuration. The throughput rate of the bus may vary. A few of exemplary buses are the 31.25 kbit/s bus, the 1.0 Mbit/s bus, and the 2.5 Mbit/s bus.

The 31.25 kbit/s bus is generally used for process control applications, such as temperature, level, and flow control. The 1.0 Mbit/s bus and 2.5 Mbit/s bus are usually used for high speed applications. Devices operating on 1.0 Mbit/s bus and 2.5 Mbit/s buses are usually self-powered or draw power from a separate power bus in the fieldbus cable (i.e., 4 wire cable), however, they can also be powered directly from the fieldbus.

In the preferred embodiment, there are several link master 105 devices operating on the same bus 120. When these link master 105 devices are activated, these link master 105 devices bid for the responsibility of becoming the link active scheduler 100. In the preferred embodiment, the link master 105 device which becomes the link active scheduler 100 is the device with the lowest network address. In alternative embodiments, a particular device may be the "preferred" link master. In which case, when the system is activated the link master 105 with the lowest network address would assume the responsibilities of the link active scheduler 100. Then, the "preferred" link master 105 would send a message to the link active scheduler 100 directing it to transfer control. Upon receipt of the message, the link active scheduler 100 would transfer control to the preferred link master 105.

However, there are a variety of ways to conduct the bidding process. For example, one type of bidding process is shown in U.S. Pat. No. 5,526,358, issued Jun. 11, 1996, which is hereby incorporated by reference. The bidding process is also conducted if the link active scheduler 100 controlling a bus 120 malfunctions or is removed.

The control system can also include a bridge 130 to interconnect to individual buses and create larger networks. Communication between the individual buses can be monitored by operator stations 150.

To describe this control system in detail, it is only necessary to describe a link master 105 because it contains the same control capabilities as a link active scheduler 100. A link master 105 incorporates a program interface comprising the following three layers: (1) a physical layer, (2) a communications stack, and (3) a user layer.

Figure 2:
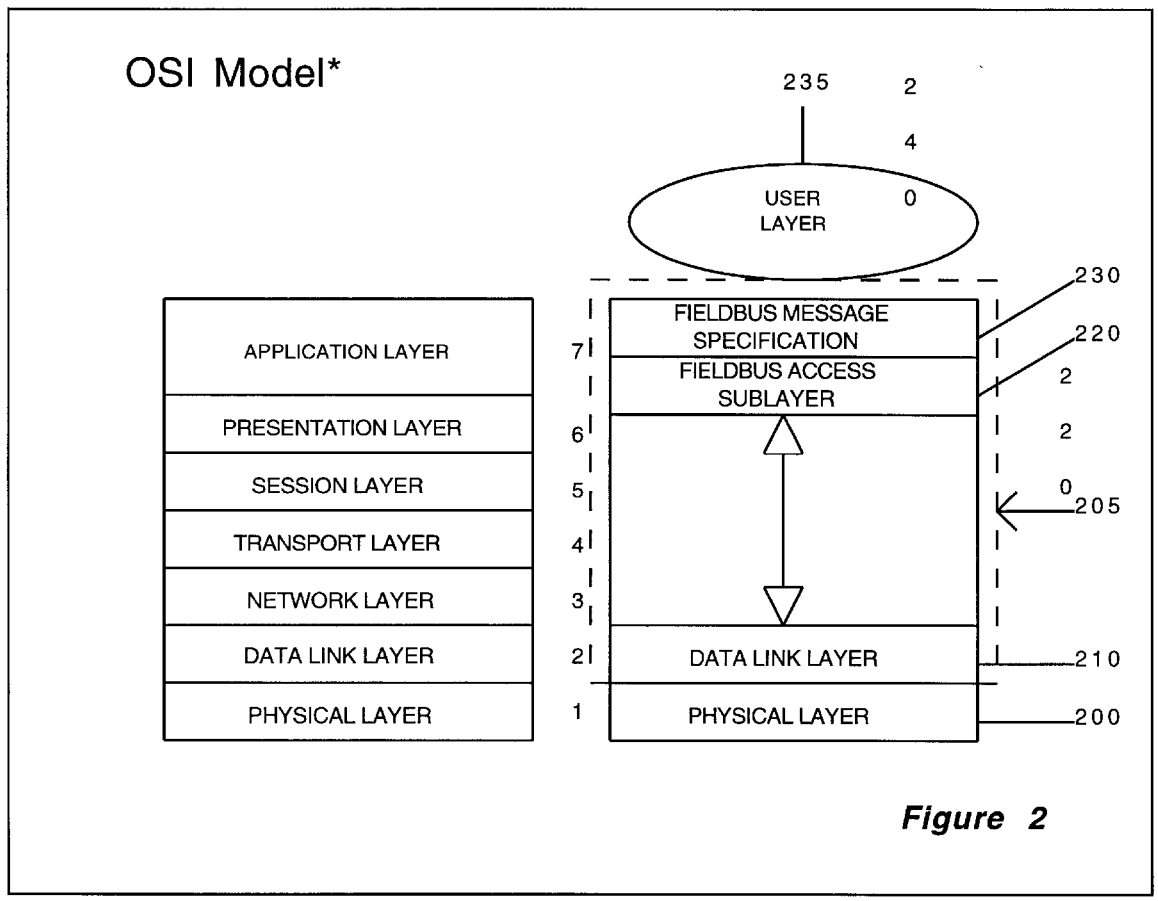
FIG. 2 shows the Open Systems Interconnect layered communication model as compared to the communication model of the present invention.

As shown in FIG. 2, the physical layer (PHY) 200 and the communications stack 205 are derived from the Open Systems Interconnect (OSI) model. The physical layer (PHY) 200 is the same as OSI layer 1, and the communications stack 205 corresponds to OSI layers 2 and 7. The user layer 235 is not defined by the OSI model. In alternative embodiments, the physical layer 200 and communications stack 205 may be derived from a variety of different networking standards, such as Transmission Control Protocol/Internet Protocol (TCP/IP) and UNIX. A detailed description of each of these layers follows.

I. PHYSICAL LAYER

As shown in FIGS. 1 and 2, the physical layer 200 receives messages from the communication stack 205 and converts the messages into physical signals on the transmission medium 120 and vice versa. The physical layer 200 is defined by approved standards from the International Electrotechnical Commission (IEC) and the International Society of Measurement and Control (ISA). For more information about the physical layer 200, see ISA document S50.02-1992 and IEC document 1158-2, which is hereby incorporated by reference. In the preferred embodiment, the messages are encoded using the well known Manchester Biphase-L technique and the clock signal is embedded in the serial data stream. The hardware required to translate inbound messages from the bus 120 and outbound messages from a processor within the device is generally called the medium attachment unit, such as a network adapter. After the physical layer 200 translates an inbound message from the bus 120, it forwards it to the communications stack 205. The communication stack 205 is described below.

II. COMMUNICATIONS STACK

FIG. 2 shows the preferred communications stack 205. In this embodiment, the communication stack 205 includes the data link layer 210, the fieldbus access sublayer 220 and the fieldbus message specification 230. The data link layer is the same as OSI layer 2. The fieldbus access sublayer 220 and fieldbus message specification 230 are sublayers within the OSI application layer, OSI layer 7. The preferred communications stack 205 does not use layers 3–6. The layers of the communications stack 205 are described below.

A. Data Link Layer

The data link layer 210 controls transmission of messages onto the bus 120 from a link active scheduler 100, link master device 105 or basic device 110 based the instructions of a network controller or the link active scheduler 100. In the preferred embodiment, the data link layer 210 is a subset of the IEC and ISA data link layer standard.

The link active scheduler 100 controls the data link layer 210 according to a network schedule stored in a memory. The network schedule is a list of transmit times for data buffers within the system. The data buffers store data collected by the field devices. For example, if the field device is a thermometer, the data buffer stores the temperature, and upon command, publishes the temperature reading onto the bus 120. Additionally, the link active scheduler 100 can identify all the field devices operating on the system because it maintains a "live list." The link active scheduler 100 maintains the live list by periodically transmitting a pass token message. Any field device properly responding to the pass token is kept on the live list. If a field device fails to respond to the pass token after a predetermined number of attempts, the device is removed from the live list.

New devices can also be added to the live list. The link active scheduler 100 periodically sends probe node messages to network addresses not listed in the live list. If a field device is present at the network address and receives a probe node message, the field device immediately returns a probe response message. If the field device answers with a probe response message, the link active scheduler 100 adds the field device to the live list and confirms the field device's addition by sending the field device a node activation message.

Whenever a field device is added or removed from the live list, the link active scheduler 100 broadcasts the changes to the live list to all field devices. This allows each field device to maintain a current copy of the live list.

The link active scheduler 100 also schedules the communications from other field devices operating in the system. The link active scheduler 100 coordinates the timing of each communication by issuing compel data messages at the scheduled times. Upon receipt of the compel data message, the requested field device broadcasts or publishes its data to the other field devices operating in the system. To assure proper synchronization, the link active scheduler 100 also periodically broadcasts a time distribution message on the bus 120 so that all field devices have exactly the same data link time. The time distribution message is a message which includes the data link time. The data link time is the system time of the link active scheduler 100. When the time distribution message is received by the link masters 105, the link masters 105 reset or recalibrate their individual system times to the data link time.

The remaining operations are performed between scheduled messages or data exchanges. The link active scheduler 100 grants permission to other field devices to use the bus 120 by issuing a pass token message to an individual device. When the individual field device receives the pass token, the field device is allowed to send messages until the field device is finished sending messages or until the maximum token hold time has expired, whichever is shorter. The token hold time is the amount of time the device can send messages after receiving the pass token. This method of control management is commonly called token passing control. A variety of techniques for implementing token passing control are well-known to those skilled in the art.

Figure 3:
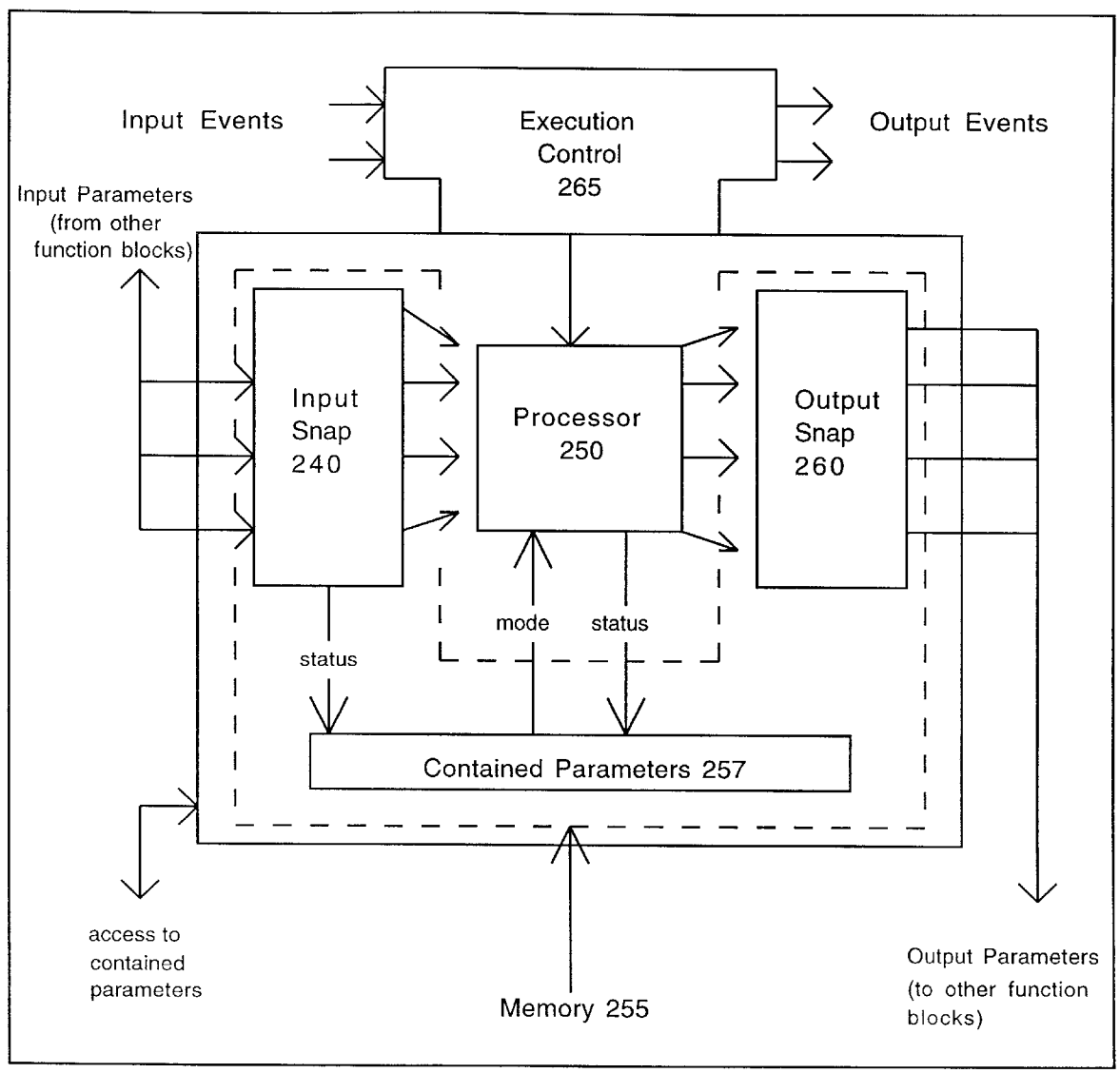
FIG. 3 illustrates a hardware embodiment of a field device.
Figure 8:
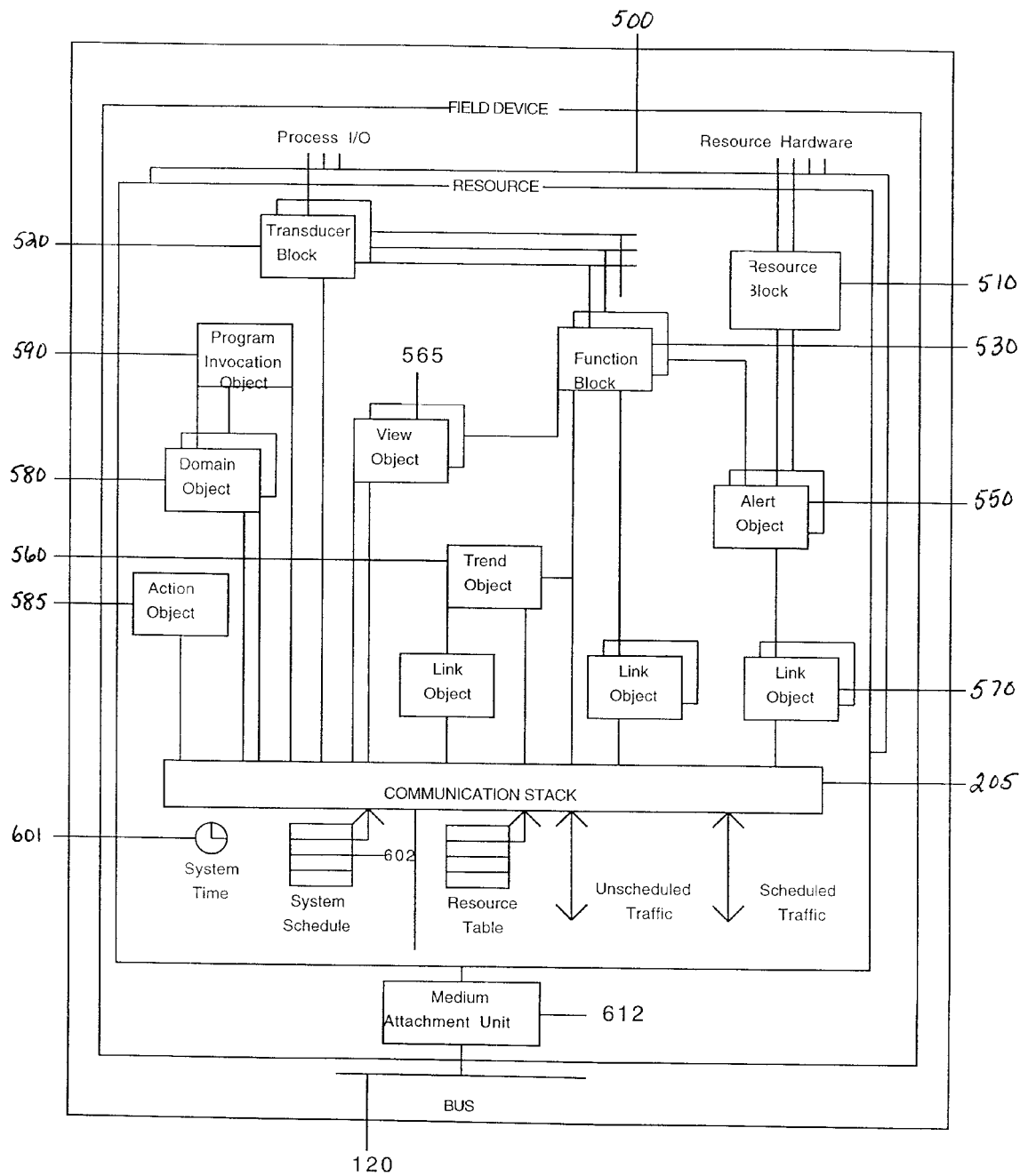
FIG. 8 illustrates a function block application structure within a field device.

To control the data exchanges each device preferably includes an input snap 240, processor 250, memory 255, contained parameters 257 and output snap 260, and a medium attachment unit 612, as shown in FIGS. 3 and 8. The input snap 240 and output snap 260 protect parameter values from write access or other external interferences during execution of a block. The processor 250 processes the execution of stored blocks as well as the algorithms and programs within the blocks. The snapped parameters and contained parameters 257 are stored in the memory 255. The memory is preferably EEPROM or FLASHROM to permit programming of the device without the danger of losing data due to power loss. In alternative embodiments, the memory 255 may be ROM, RAM, or EPROM.

B. Fieldbus Access Sub-Layer

Figure 4:
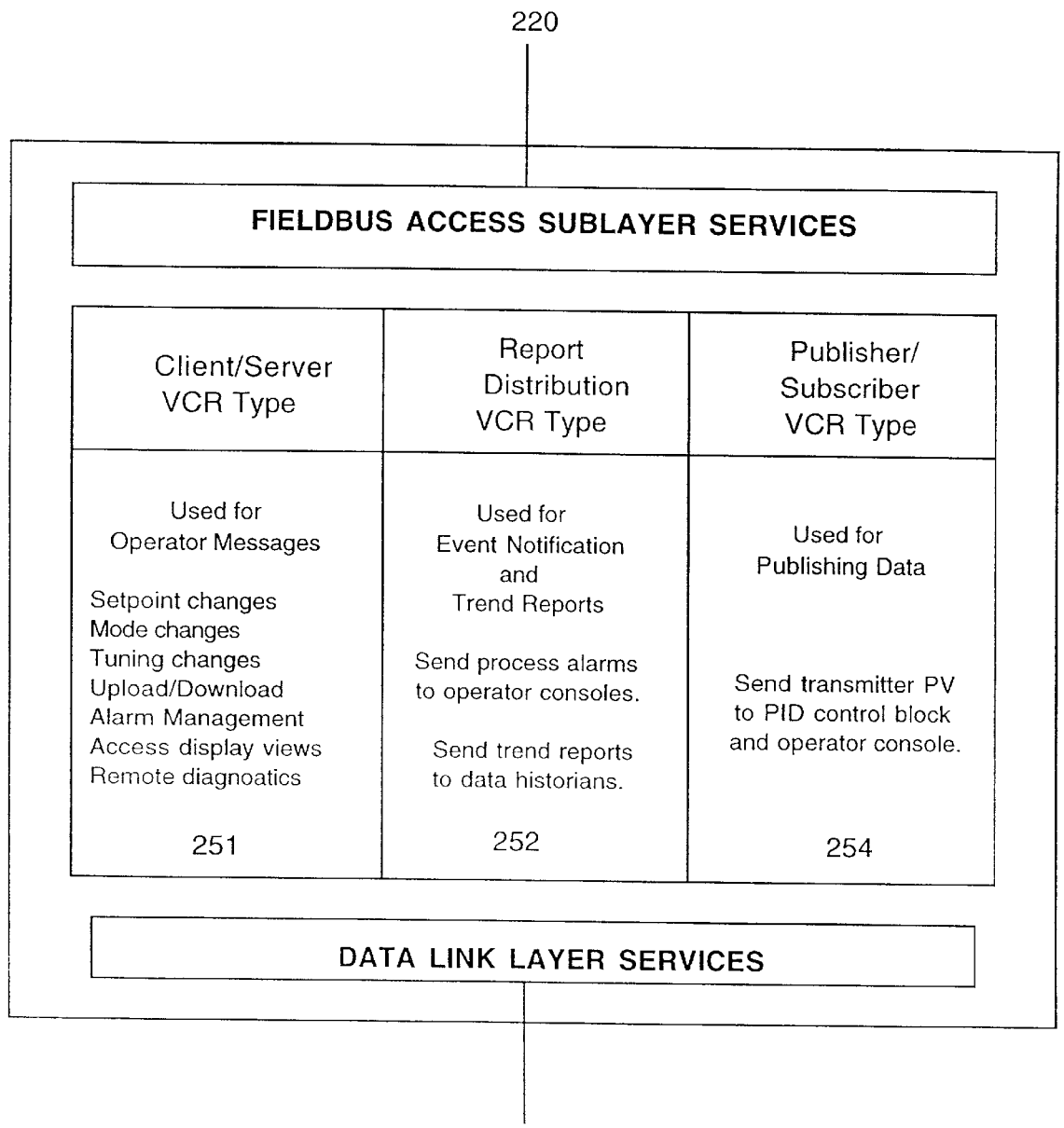
FIG. 4 summarizes the virtual communication relationships provided by the Fieldbus Access Sublayer.

The next layer in the communications stack 205 is the fieldbus access sublayer 220. The fieldbus access sublayer 220 uses the scheduled and unscheduled data exchanges of the data link layer 210 to provide a service for a fieldbus message specification 230. The service provided by the fieldbus access sublayer 220 is the efficient addressing of commonly sent messages. Some examples of fieldbus access sublayer services are called virtual communication relationships (VCRs). FIG. 4 shows three types of VCRs: client/server 251, report distribution 252, and publisher/subscriber 254.

The client/server VCRs 251 are used for operator messages, such as the types of messages listed in FIG. 4. Specifically, client/server VCRs 251 are queued, unscheduled, user-initiated, one-to-one communications between field devices. Queued means that the messages are sent and received in the order the messages were submitted for transmission without overwriting the previous message. In the preferred embodiment, a field device can send a message requesting a data exchange when the field device receives a pass token message from the link active scheduler 100. The requesting device is called the client. The device that receives the request is called the server. The server responds when it receives a pass token message from the link active scheduler 100.

The report distribution VCRs 252 are used for event notification, such as alarm notifications to operator consoles and trend reports. Specifically, the report distribution VCRs are queued, unscheduled, user-initiated, one-to-many communications. The report distribution VCRs 252 allow a device to send a message to a common address, such as "ALL OPERATOR CONSOLES."

The publisher/subscriber VCRs 254 are used for publishing data. Specifically, the publisher/subscriber VCRs 254 are buffered, one-to-many communications. Buffered means that only the latest version of the data is maintained within the network. New data overwrites previous data. In the preferred embodiment, a field device publishes or broadcasts messages to other field devices on the bus 120 when the field device receives a compel data message from the link active scheduler 100. The publisher/subscriber VCR 254 is used by the field devices for scheduled publishing of user layer function block inputs and outputs. The publishing of user layer function block inputs and outputs is discussed in more detail later.

C. Fieldbus Message Specification

Figure 5:
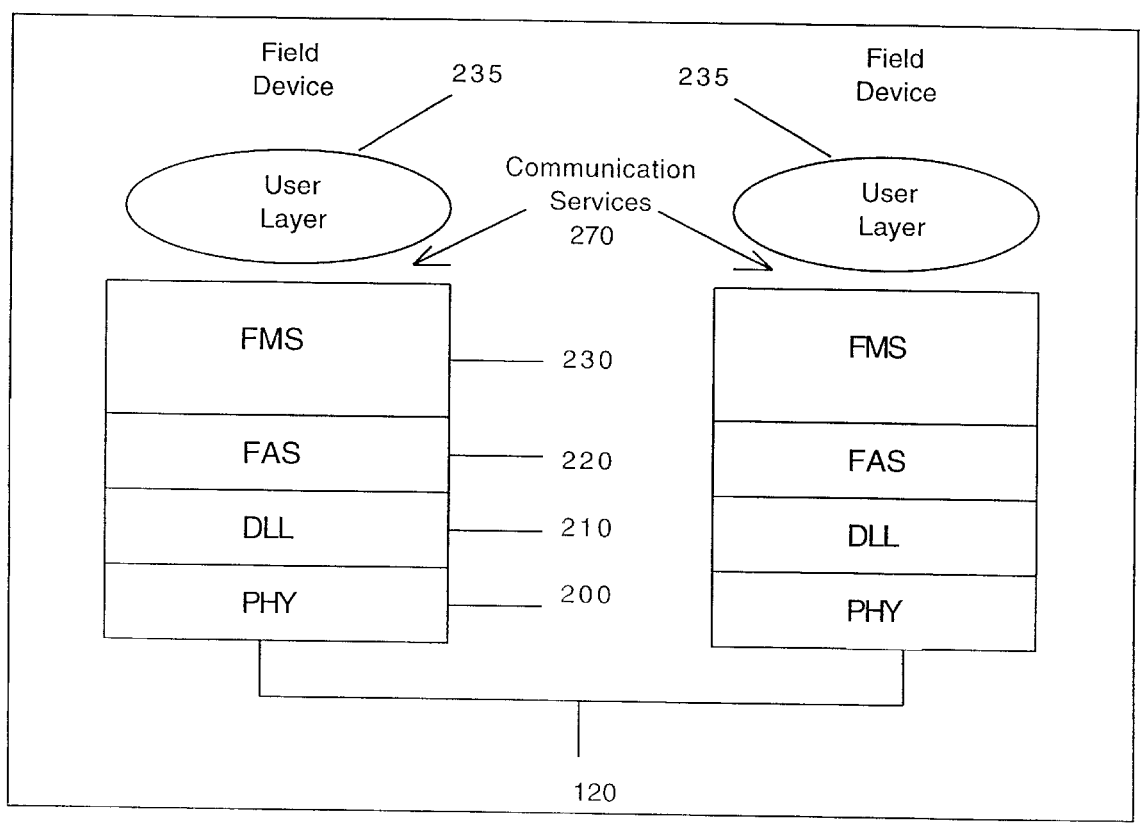
FIG. 5 illustrates two devices interconnected via the communication services.

Another layer in the communications stack 205 is the fieldbus message specification 230. The fieldbus message specification 230 allows function block applications to send messages to each other using a standard set of message formats. The fieldbus message specification 230 describes communication services 270, message formats and protocol behavior needed to build a message for the user layer 240, as illustrated in FIG. 5. In the preferred embodiment, the formatting of fieldbus message specification messages is defined by a formal syntax description language called Abstract Syntax Notation 1 developed by International Telegraph and Telephone Consultive Committee.

Figure 6:
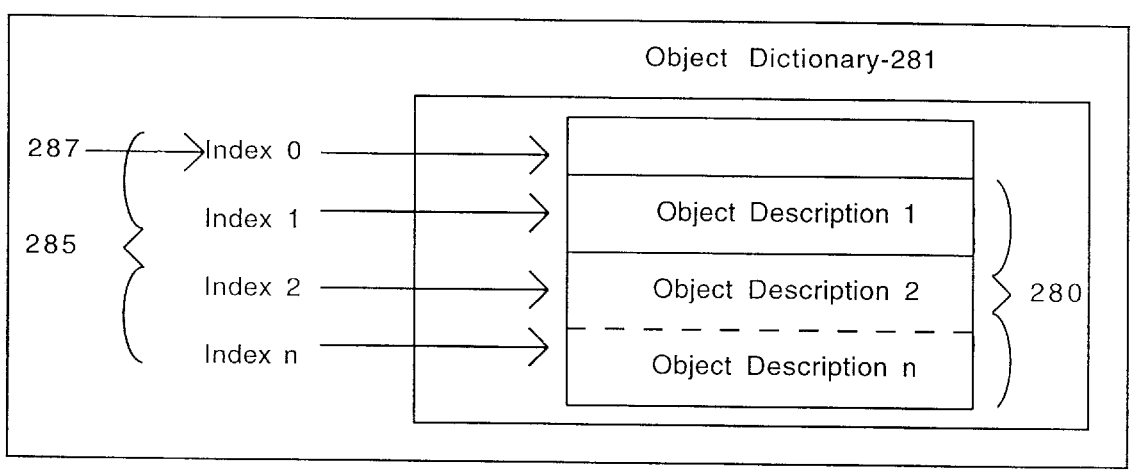
FIG. 6 illustrates an object dictionary.

Data that is communicated over the bus 120 is described by an object description. Object descriptions 280 are collected together in a structure called an object dictionary 281, as illustrated in FIG. 6. The object descriptions 280 are identified by an index number 285. An index number is a cross reference to the location where a particular object description is stored in memory. Index zero 287, called the object dictionary header, provides a description of the dictionary itself and defines the first index for the object descriptions of the function block application 440.

In the preferred embodiment, index numbers 1–255 define standard data types, such as Boolean, integer, floating point, bit string, and data structures, that are used to build all other object descriptions 280. The index numbers above index number 255 cross reference user layer object descriptions 280.

The communication services 270, shown in FIG. 5, provide a standardized way for user layers 235 to communicate over the fieldbus. Some examples of communication services 270 are context management service, object dictionary service, and variable access. In the preferred embodiment, the context management services are used to establish and release virtual communication relationships with a virtual field device. The object dictionary service allows the user layer 235 to access and change the object descriptions in a virtual field device. The variable access services allow the user layer 235 to access and change variables associated with an object description.

Figure 7:
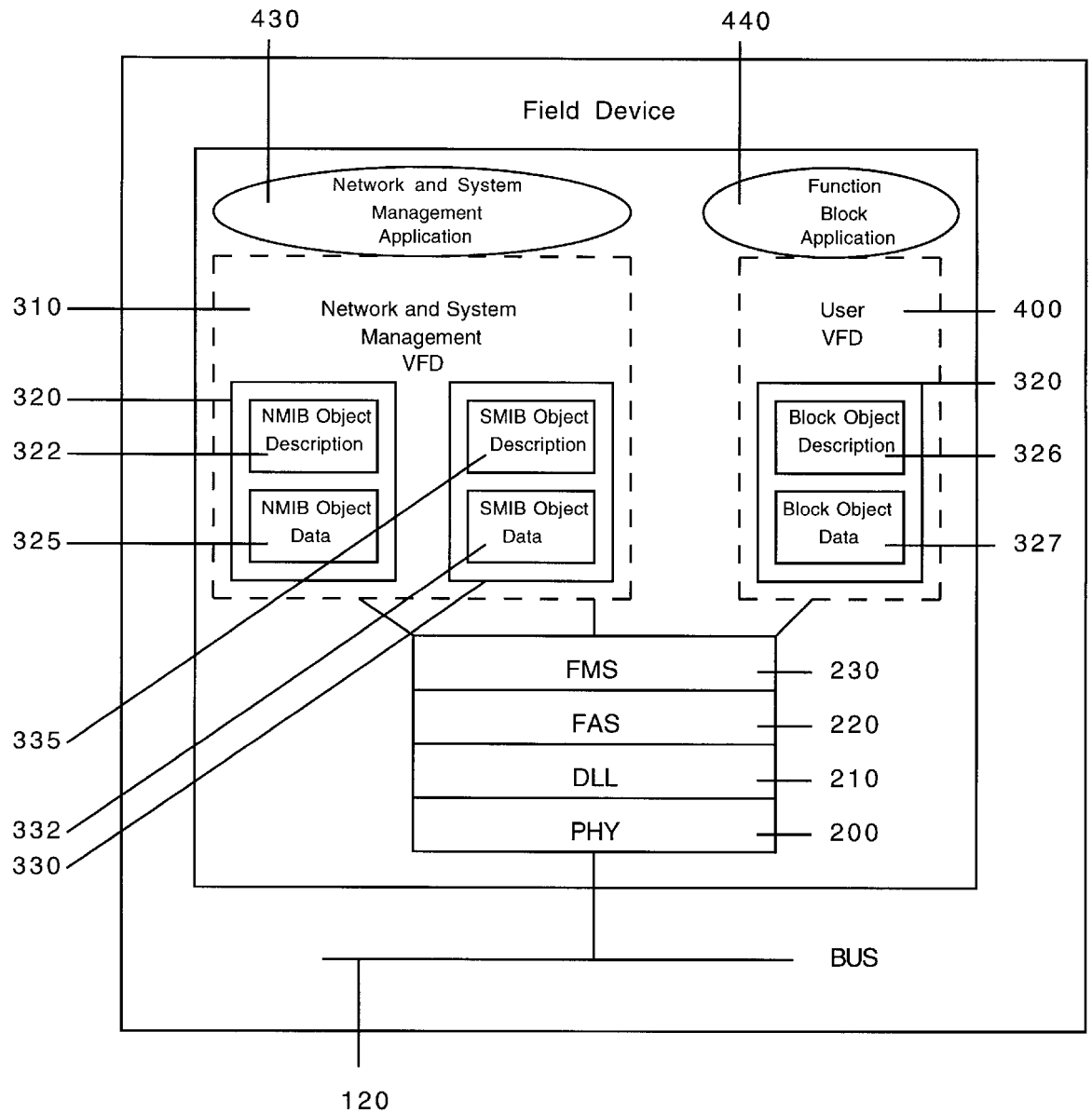
FIG. 7 illustrates the virtual communication devices within the communication model of the present invention.

In addition, the communication services 270 allow the fieldbus message specification 230 to communicate with the virtual field devices 310, 400 in the user layer 235. As shown in FIG. 7, a field device will have at least two virtual field devices, a network and system management virtual field device 310 and a user virtual field device 400.

The network and system management virtual field device 310 typically stores network management data 320 and system management data 330. The network management data includes a network management information base (NMIB) object descriptions portion 322 and a NMIB object data portion 325. The system management data 330 includes a system management information base (SMIB) object descriptions portion 332, and a SMIB object data portion 335. The user virtual field device 400 includes block object data 327 including block object description 326.

The system and network management information base object descriptions 322, 335 describe the system and network format for the the system and network management information base object data 325, 332.

In the preferred embodiment, a few standard communication profiles are used to allow field devices to communicate and work together on the same transmission medium 120. The communication profiles preferably used in function block applications 440 are defined dependent on the field devices category or class. The specification for these communication profiles are shown in Appendix A-Specification Communication Profile. Also, to configure and maintain field devices and their function block application, a common file format is recommended. The specification for the common file format used in the preferred embodiment is shown in Appendix B-Specification Common File Format.

III. USER LAYER

The user layer 235 processes the information gathered by the field device operating in the system. As shown in FIG. 2, the user layer 235 is an additional layer added to the OSI model. As shown in FIG. 7, the user layer is generally composed of a network and system management application 430 and at least one function block application 440. Each with its own virtual field device described above.

The function block application 440 defines the field device's functionality. A function block application 440 includes one or more resources 500, as shown in FIG. 8. A resource 500 is a logical subdivision within the software and/or hardware structure of a device. A resource 500 has independent control of its operation, and its definition may be modified without affecting related resources.

A. Introduction

As shown in FIG. 8, a resource 500 is built of blocks and objects, such as: a resource block 510, transducer blocks 520, function blocks 530, trend objects 560, view objects 565, link objects 570, alert objects 585, system time 601, function block schedules 602, and network traffic. Network traffic includes scheduled and unscheduled traffic. A brief description of the blocks and objects used in the preferred embodiment is provided below.

A function block 530 represents the basic automation functions performed by a resource, such as an analog input, analog output, or proportional/derivative (PD), or any other function required for process or manufacturing control devices. Function blocks 530 are designed to be as independent as possible of the specifics of input/output devices and the network.

Each function block 530 uses input parameters according to a specific algorithm and internal set of contained parameters. Input parameters are structured parameters composed of a value field and a status field. The data type specified for input parameters is dependent on the data type of its value field. The status field is identical for all input parameters. Contained parameters may be used to provide values to the block algorithm. The values of the contained parameters may be set by the manufacturer or as part of the configuration. The contained parameters may also be set during operation. The input parameters and contained parameters are processed according to the specific algorithm to produce output parameters. The output parameters are available for use within the same function block 530 or by other function blocks 530.

Transducer blocks 520 can preprocess and postprocess data between the function blocks and hardware 530 devices, such as sensors, actuators, and switches. Transducer blocks 520 can control access to the input/output devices through a device independent interface used by function blocks 530. Transducer blocks 520 can also perform functions, such as calibration and linearization.

The link object 570 exchanges data between function blocks 530 within a resource 500 or between resources. The data exchanged by the link object 570 can include process data or events. In addition, the link object 570 can exchange trend report data or alert notification data.

A resource block 510 makes the hardware specific characteristics of a device accessible to the network. The resource blocks 510 insulate the function blocks 530 from the resource hardware by including a set of implementation independent hardware parameters.

View objects 565 and trend objects 560 provide efficient access to parameter data within a function block application 440. View objects 565 allow groups of parameters to be accessed by executing a single communication request. Trend objects 560 allow a collection of parameter samples to be reported in a single communications transfer.

Alert objects 585 support the reporting of events to an interface device and other field devices. Upon detection of a significant event, a function block 530 may send an alert message using an alert object 585. A significant event is an event that affects system operation. As a result, the present invention can report its own errors, alerting operators to problems on a "real-time" basis. Thus, the present invention improves productivity by reducing down time, and operator and plant safety.

System time 601 is provided by system management to function block applications (i.e., one or more resources) 440 for use in synchronizing operations between field devices. Each device 100, 105, 110 keeps its own system time 601. Each device 100, 105, 110 uses its system time to control the execution of its internal function blocks. Time stamping of alarms, events, and trend information is based on system time 601 maintained by each device.

System management coordinates the execution of the function blocks 530 according to a system schedule. The system schedule is a list of execution times for function blocks within a device. Additionally, the execution of a function block 530 may also be invoked by the completion of the execution of another function block 530. System management is described in more detail later.

B. Application Framework

Once the components (i.e., the blocks and objects) are implemented, they are completed or connected by an application framework. The application framework coordinates the communication between components internally and externally. Internal communication means communication between function blocks 530, regardless of whether they are in the same field device. External communication means communication between field devices with function blocks 530 and field devices without function blocks. The connection of these blocks by the application framework results in a modular system allowing the functionality of an application to be more extensible and portable. The functionality is extensible in the sense additional functionality can easily be added to existing function. The functionality is portable in the sense that functionality can easily be moved from one location in a system to another or even from one system to another.

Figure 9:
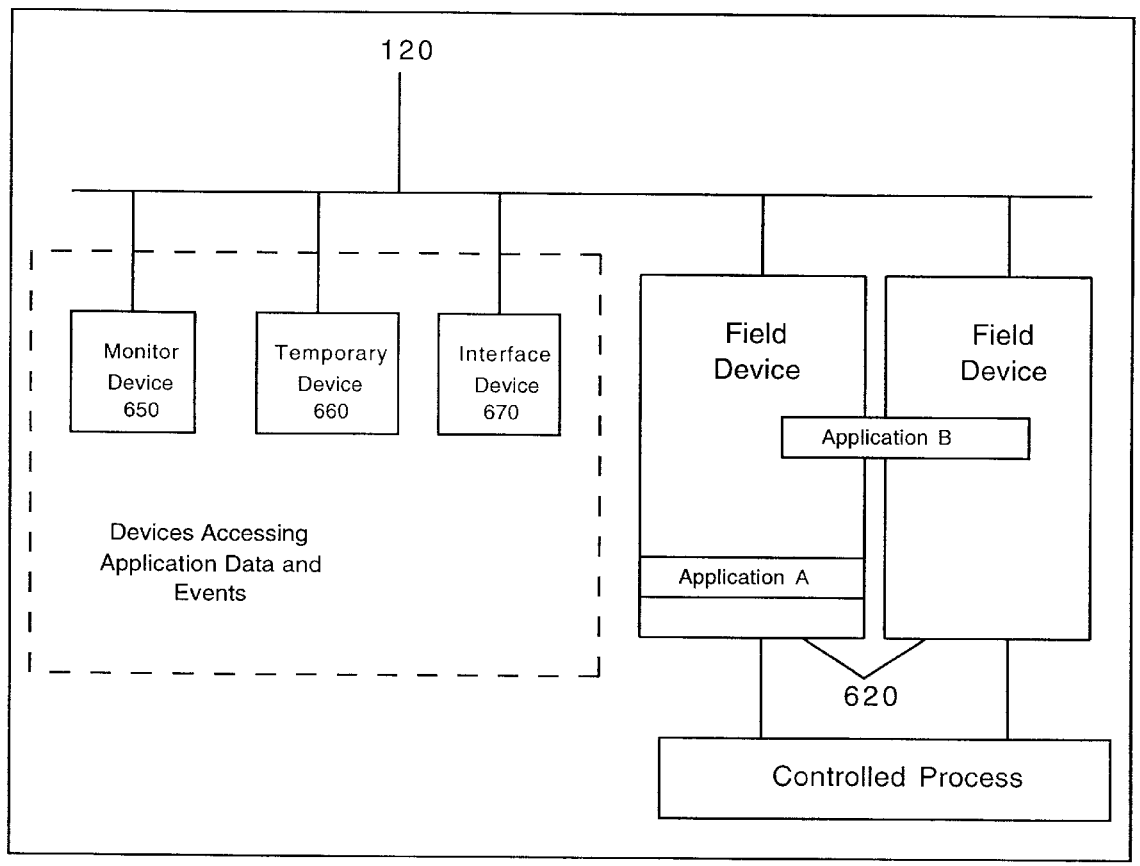
FIG. 9 illustrates external devices interconnected on a bus with field devices.

FIG. 9 shows some examples of external communications. Specifically, FIG. 9 shows the communication of field devices 620 and a monitor device 650, a temporary device 660, and an interface device 670. Unlike the field device 620, the other devices 650, 660, 670 contain applications which are not implemented as function blocks. The monitor device 650 is connected to the application framework, but does not have a network address. A monitor device monitors communications on the network (e.g., a diagnostic tool may be a monitor device). A temporary device 660 supports diagnostics and adjustment of parameter values. An interface device 670 provides an operator interface, control applications, and/or configuration and diagnostic support.

In addition to external and internal interactions, a variety of other possible interactions are well known to one of ordinary skill in the art. For example, there may be interactions with configuration applications, interactions with a human interface application, interactions with other control applications, interactions for the establishment of function block links, interactions with other resources, interactions with system management, and many more.

1. Function Block Application Structure

As stated above, a function block application 440 defines the functionality of the field device, and includes one or more resources 500. A resource is a logical subdivision within the software and/or hardware structure of the device. Although not shown, function block applications 440 are generally implemented using multiple resources. As shown in FIG. 8, the resources 500 which make up a function block application 440 may be modeled as a set of blocks or objects coordinated to execute a related set of operations.

A block is a logical processing unit of software comprising a named copy of the block and parameter data structure specified by function type. A named copy of the block is an encapsulated software processing unit, such as an algorithm or computer program. The block is encapsulated to create a modular system with the flexibility for upgrades or improvements. The software processing unit can include a computer program and parameters. The software unit is designed to be independent of other blocks and perform a function which can be used in many different function block applications.

A block is identifiable by its class or subclass. The class of a block indicates its parameters, and how the parameters affect the execution of the software processing unit. A block class specifies the common attributes shared by all instances of the class, including block elements (e.g., input and output events, contained parameters, and common function) and association with resource function (e.g., alarm notifier and function block services). Each block subclass assumes all the parameters specified by the class, as well as the additional parameters attributed to the subclass.

Block classes are classified as elementary or composite. A composite block class is one whose algorithm requires the invocation of functions and/or component blocks of the composite block. An elementary block has a fixed algorithm and does not require the use of component functions or function blocks. Specific examples of elementary and composite blocks are described in detail later.

2. Function Block Application Hardware

In the preferred embodiment, each device contains at least one function block application 440. To execute the function block application 440, a device usually contains an input snap 240, processor 250, memory 255, output snap 260, and execution control 265, as shown in FIG. 3, as well as the communications stack 205 and medium attachment unit 612, as shown in FIG. 8.

The medium attachment unit 612, such as a network adapter, receives signals from other devices over the transmission medium 120 and translates the signals into a message for the processor 250. For example, the medium attachment unit 612 converts or translates a message from the processor 250 into a signal for transmission over the transmission medium 120, or a signal from the transmission medium 120 into a message for the processor 250.

The input snap 240, processor 250, memory 255, and output snap 260 are for executing the transducer blocks, function blocks, and resource block within a function block application. Specifically, the input snap 240 receives and holds input parameters. These input parameters may be constant or received from other function blocks. The processor 250 executes or processes a software program or algorithm based on these input parameters and any contained or stored parameters. These parameters are discussed in more detail below. The processor 250 is preferably a microprocessor or programmable logic array. Any software programs or parameters used by the processor 250 are stored in the memory 255, which is preferably EEPROM or FLASHROM. The functionality of the function block application 440 is only limited by the size of the memory 255 and the processing speed of the processor 250. The output of the processor 250 is then sent to an output snap 260.

The input snap 240 and output snap 260 are responsible for protecting parameter values from external interferences, such as write access, while the processor 250 is executing. In other words, once the processor 250 begins processing the inputs, the input snap 240 and output snap 260 hold the inputs and outputs constant until the processing is complete.

3. Parameters

Parameters define the inputs, outputs, and data used to control block operation. The parameters are accessible over the network.

An input parameter obtains its value from a source external to the block. An input parameter may be linked to an output parameter of another block within its resource 500 or within another device. An input parameter is an input variable or constant which is processed by the algorithm or program of a function block 530.

An output parameter is a parameter which may be linked to an input parameter of one or more blocks. Output parameters contain both value and status attributes. The output status attribute indicates the quality of the parameter value generated.

A contained parameter is a parameter whose value is configured, calculated, or set by an operator or higher level device. In the preferred embodiment, a contained parameter cannot be linked to another function block input or output, and therefore may not contain status attribute.

i. Parameter Identifiers

Each parameter is characterized by its identifiers, storage, usage, and relationship to other parameters. Each parameter can be characterized by more than one identifier. For example, a parameter within a block is uniquely identified by its parameter device identification, and a parameter within a system is uniquely identified by its device identification and tag. Tags provide a unique symbolic reference to each block within the system.

The data type for a parameter is specified by its data type index. The data type index is the object dictionary index of the data type. The data type index specifies the machine independent syntax of the parameter. Preferably, the machine independent syntax of the parameter is an abstract syntax. The user layer 235 encodes/decodes the data according to the transfer syntax rules in the fieldbus message specification 230. Additionally, a variety of other parameters may also be stored in the object dictionary 281 and referenced by its object dictionary index number.

ii. Parameter Storage

Parameter attributes may be classified as dynamic, static, or nonvolatile. Dynamic parameters are values calculated by the block algorithm and, therefore, do not need to be restored after power failure.

Static attributes are a specific, configured value that must be restored after a power failure. An interface device 670 or temporary device 660 may write to static parameter attributes on an infrequent basis. Static parameter attributes can be tracked by a configuration device.

Non-volatile parameter attributes are written on a frequent basis and the last saved value must be restored by a device after power failure. Since the value of these parameter attributes is constantly changing, can be tracked by a configuration device.

4. Parameter Relationships

The execution of a block involves input parameters, output parameters, contain parameters, and the algorithm or computer program stored within the block. The execution time for a block's algorithm is defined as an attribute of the block. The length of execution time is dependent on the hardware and software implementation.

In simple blocks, input parameters are received before block execution. When the block begins execution, the input values are snapped to prevent them from being updated while they are used by the algorithm.

However, before these input parameters are processed, the input parameters are used to determine if the algorithm can achieve the desired mode. In the preferred embodiment, a function block application can achieve a variety of modes, such as out of service (O/S), initialization manual (IMan), local override (LO) manual (Man), automatic (Auto), cascade (Cas), remote-cascade (RCas) and remote output (ROut) mode. The out of service, initialization manual, and local override modes are described below.

When a block is in the out of service mode, the block is not being evaluated, and the output is maintained at the last value.

When a block is in the initialization manual mode, the block output is being set in response to the back calculation input parameter status. When the status indicates there is no path to the final output element, then the control blocks initialize to provide for bumpless transfer when the condition clears. A back-calculation output parameter is supported by all output and control class function blocks. The setpoint may be maintained or, optionally, initialized to the process variable parameter value.

The local override mode applies to control and output blocks that support a track input parameter. The local override mode may be enabled by a local lock-out switch on the device or a variety of other ways. In the local override mode, the block output is being set to track the value of the track input parameter. The setpoint may be maintained or, optionally, be initialized to the process variable parameter value.

The determination of whether the block is able to achieve the desired mode is made by comparing the actual mode attribute and the target mode attribute. The actual mode attribute reflects the mode of operation which the block is able to achieve. The target mode attribute indicates what mode of operation is desired for the block. The target mode is usually set by a control application or by an operator through a human interface application.

Once the actual mode is determined, the block execution progresses and the outputs are generated. If alert conditions are detected, alarm and event output parameters are updated for reporting by an alert object. When the execution is complete, the outputs are snapped making them available for external access. Prior to being snapped, only the previous values are available for external access.

C. Resource Components

As stated above, a function block application 440 contains one or more resources, and a resource 500 includes one or more blocks. A block is identifiable by its class or subclass. The class of a block indicates its parameters, and how these parameters affect the execution of its algorithm or program. The Resource Components Section provides the formal models for the preferred classes. The preferred classes include a resource class, directory object class, block object class, parameter object class, link object class, alert object class, trend object class, view object class, domain object class, program invocation object class, and an action object class. In alternative embodiments, someone skilled in the art could define a system with more, less, or different classes.

1. Resource Class

The resource class defined in the preferred embodiment specifies the descriptive attributes of the resource. The object dictionary of each resource contains a description of the components contained within the resource. The resource class includes the following attributes: resource name, vendor name, model name, revision, logical status, physical status, and object dictionary.

The vendor name identifies the vendor of the software and/or hardware associated with the resource. The model name specifies the model of the software and/or hardware associated with the resource. The revision attribute is the revision level of the software and/or hardware associated with the resource. The logical status attribute contains information about the communication functionality associated with the resource. The physical status attribute gives a coarse summary of the hardware component associated with the resource. The object dictionary contains the attributes of an object dictionary directory object, resource block, and other objects specific to the function block application 440 process. Each of these attributes are accessible through the fieldbus message specification 230.

Someone skilled in the art will recognize these attributes and the attributes defined for any class or subclass are only illustrative of the attributes that could be used. In alternative embodiments, the resource class or any other class or subclass could include more, less, or different attributes. This concept applies to all of the classes and subclasses described in this specification.

2. Directory Object

Another preferred class is the directory object class. A directory object acts as a guide to other blocks and objects within a resource or function block application 440. The directory object contains a list of references to the other blocks and objects making up a resource or function block application 440. This information may be read by an interface device or temporary device desiring to access objects in the object dictionary. The directory object class is defined as including the following attributes: member identification; starting index of the static object dictionary; data type; sub-index entries; data length; usage; storage; list of valid values; initial value; and item identification.

The member identification attribute is the unique number which identifies the function of the directory. The index is the index of the directory object in the object dictionary. The various data types include meta type or type name. Meta type indicates the object type. Type name specifies the name of the data type of the object. The sub index entries allow the attributes of a directory object to be accessed individually through the read and write service. The data length attribute specifies the number of bytes reserved to represent the sub index values in the directory. The usage attribute indicates that this is a contained object and may not be referenced by link objects for connection to function block parameters. The storage attribute indicates whether the parameter is stored in static memory. The list of valid values specifies the values permitted for the sub index attributes of the directory object. The initial value specifies the initial value assigned to the sub index attributes of the object directory, and the item identification identifies the description of the object.

3. Block Object

The block object preferred class specifies the characteristics common to the function blocks, transducer blocks, and resource blocks. In the object dictionary, parameters follow continuously after the block object, each having an index. The block object class is defined by the following attributes: member identification; block index; data type; sub index; data length; usage; storage; list of parameters; list of valid values; and item identification. The member identification identifies the function of the block. The block index is the index of the block object in the object dictionary. The data type includes the meta type and type name. The meta type indicates the object type. The type name specifies the name of the data structure of the block. The sub index includes attributes, such as block tag, member identification, item identification, revision, profile, profile revision, execution time, period of execution, number of parameters, next block to execute, starting views, number of view 3 objects, and number of view 4 objects. The data length attribute equals 62. The list of parameters includes static revision, tag description, strategy, alert key, mode, and block error. The remaining attributes were described above.

The three sub-classes of the block object class used in the preferred embodiment are resource block objects, transducer block objects, and function block objects.

i. Resource Block

The resource block object defines hardware specific characteristics of its associated resource. Because the resource block object is a sub-class of the block object model, the resource block object assumes the list of parameters attributed to the block object, as well as its own additional attributes. The additional attributes in the resource block subclass are: resource state, test, resource, additional contained parameters; execution time=0, period of execution=0, and the next block to execute=0.

A resource block insulates the function blocks from the physical hardware by containing a set of implementation independent hardware parameters. The resource block is manufacturer specific; and all its parameters are defined as contained.

ii. Transducer Blocks

Another subclass of the block object class is a transducer block object. Transducer blocks are defined to decouple function blocks from the local I/O functions required to read sensor hardware and command hardware. This permits the transducer block to execute as frequently as necessary to obtain data from sensors without burdening the function blocks that use the data. It also insulates the function block from the manufacturer specific characteristics of an I/O device.

The transducer block object is a subclass of the block object, and thus, it assumes all the attributes of the block class. The additional attributes of the transducer block subclass are: additional contained parameters; execution time=0; period of execution=0; and next block to execute=0.

iii. Function Blocks

Function blocks represent the basic automation functions performed by a resource, such as an analog input or discrete output. Function blocks are the primary means of defining monitoring and control in a function block application. They are designed to be as independent as possible of the specifics of I/O devices and the network. They work by processing input parameters and inputs from transducer blocks (or other function blocks) according to a specified algorithm and an internal set of contained parameters. They also produce output parameters and output to transducer blocks or the input of other function blocks.

Based on the processing algorithm, a desired monitoring, calculation or control function may be provided. The results from function block execution may be reflected in the output to a transducer block or to one or more output parameters that may be linked to other function blocks or directly to the device hardware.

Function blocks are a subclass of the object class. The additional attributes defined in the function block subclass are the sub-index of execution time, period execution, number of parameters, next block to execute, and additional parameters.

The sub-index attribute defines the attributes of an object which may be individually accessed through read and write services by using the sub-index number with the object index number. Sub-index numbers are defined based on Meta type.

The execution time parameter of the function block object denotes the time required for a function block to execute. The execution time may be divided into three components: pre-processing (i.e., snap of parameter values); execution; and post-processing (i.e., block output values, alarm, and associated trend parameters are updated).

To provide consistent behavior, the block algorithm executed during the execution component is broken down into the following steps. First, the algorithm determines the actual mode attribute of the mode parameter. This calculation will be based on the target mode and the status of attributes of the inputs as described above. Second, the algorithm calculates the setpoint, if the setpoint is defined for the function block. The calculation of the setpoint will be based on the actual mode, setpoint input parameters, such as cascade and remote-cascade, and any backward path input status. Also, the value of the controlled parameter, process variable, may be used for setpoint tracking. The resulting setpoint is shown in a setpoint parameter. An example of a setpoint is the temperature setting of a thermostat (eg., 72°). In other examples, the set point will change frequently.

Third, the algorithm executes control or calculation of the algorithm to determine the value and status of the output parameters. The conditions which determine the status attribute of output parameters. The value attributes of the block's input parameters and contained parameters, the actual mode, and the working setpoint are used in this algorithm. Generally, the calculation of actual mode and the use of actual mode in the algorithm account for the status of critical inputs.

Fourth, the execution phase calculates the output parameters. This step applies only to output blocks, control blocks, and calculation blocks designed to be used in the cascade path.

The period of execution of a function block is typically scheduled on a periodic basis. The period of execution is user specified based on control or monitoring requirements specific to an application. The system management services coordinate the function block execution. The management information base, which includes the system schedule, is stored in its own resource in the device. The function block period of execution is specified for a block in data link layer time. Through the scheduling capability provided by system management, it is possible to phase or stagger the execution of blocks in a device where their periods of execution time are the same or are integer multiples of each other. System management is discussed in more detail below.

The "number of parameters" attribute within the function block object is the total number of parameter objects associated with the function block, including the block object.

The "next block to execute" attribute of the function block object specifies the next function block within a device to execute to achieve minimum delay in execution within a device. If there is no next function block, then the next block to execute is zero. Thus, where multiple function blocks need to execute in series within a device, a user can specify the first function block to execute in the chain. Through the next block to execute attribute, the order of execution can be predetermined.

The "list of parameters" attribute of the function block object lists the input, output and contained parameters within a function block.

Based on the common parameters and the behavior, the preferred embodiment also defines the following subclasses of the function block subclass, including: input function block; output function block; control function block; and calculation function block.

The input function block subclass receives physical measurements or values from transducer block. The input function block subclass includes a simulation parameter by which the transducer value and status may be over-ridden. The input function block's other parameters preferably include: process variable; primary output; channel number; and additional parameters.

The output function block subclass acts upon input from other function blocks and forwards its results to an output transducer block. The output function block subclass supports the back-calculation output parameter and simulate parameter. The additional output function block attributes are: setpoint, simulate parameter, cascade input; back-calculation output; remote cascade in; remote cascade out; and channel number.

The control function block subclass acts upon inputs from other function blocks to produce values that are sent to other control or output function blocks The additional attributes for the control function block are: primary output; back-calculation; process variable; setpoint; primary input; cascade input; remote-cascade in; remote-output in; back-calculation output; remote-cascade out; remote-output out; and additional parameters. The additional calculation function block parameters are: back calculation input; back calculation output; and additional parameters.

4. Parameter Objects

Returning to the class level, parameter objects are defined to allow the function block, transducer block and resource block attributes to be accessed over the bus. The attributes defined in the basic parameter object model are: member identification; parameter index; relative index; data type; sub index; data length; units; usage; storage; list of valid values; initial value; and item identification. Not all the parameters listed are required in a particular block. Additionally, the preferred embodiment also defines several subclasses from the parameter object class, including output parameter objects, input parameter objects, and contained parameter objects.

5. Link Objects

Link objects 570 provide mapping between resources and the information exchanged via a communication network as illustrated in FIG. 8. Process data and events to be exchanged between function blocks within a resource or between resources may be defined through link objects. In addition, the communication exchange for support of trends and alerts may be defined using link objects.

Link objects 570 are defined in field devices associated with the function block applications process. Link objects 570, by referencing the appropriate VCR, may be used to access, distribute or exchange individual objects. In addition, the link objects define the association between input and output parameters, and trend reports, which interface devices must receive.

6. Alert Objects

Alert objects are used to communicate notification messages when alarms or events are detected. An event is an instantaneous occurrence that is significant to scheduling block execution and to the operational view of a function block application 440. An alarm is the detection of a block leaving a particular state. The alert object class allows alarms and events to be reported to a device responsible for alarm management.

Based on the type of alarm and event information which may be reported by blocks, the preferred embodiment designates three subclasses of alert objects. They are analog alerts, discrete alerts, and update alerts. Analog alerts are used to report alarms or events whose values are associated with a floating point. Discrete alerts are used to report alarms or events whose associated value is discrete. Update alerts are used to report a change in the static data of a block.

7. Trend Objects

Trend objects support management and control of function blocks by providing visibility into history information for reviewing their behavior. Based on the type of information collected, the preferred embodiment defines three subclasses of trend objects. These subclasses are the trend float subclass, the trend discrete subclass, and the trend bit string subclass. The trend float class collects the values and status of floating point input and output parameters. The trend discrete subclass collects the values and status of discrete input and output parameters. The trend bit string subclass collects the values and status of bit string input and output parameters.

8. View Objects

View objects support management and control of function blocks by providing "visibility" into their configuration and operation. In other words, view objects allow the user to monitor or "view" data associated with operation, diagnostic, and configuration of the system, functions block application 440 or resource 500. In the preferred embodiment there are four sub-classes of the view object class. These subclasses are view 1, view 2, view 3, and view 4. View 1 allows access to dynamic operation parameter values. View 2 allows access to static operation parameter values. View 3 allows access to all dynamic parameter values. View 4 allows access to other static parameter values.

9. Domain Objects

A domain object 580 supports download services that may be used to load data from a client into the server's domain. Data from the server's domain may be transmitted to a client through domain upload services. The domain objects are part of memory. They may contain programs or data. Domains with code and data are combined into an executable program using a program invocation object.

10. Other Objects

A program invocation object 590 provides services to link domains to a program, to start this program, to stop, and to delete it. Action objects may optionally be supported by a resource. Through an action object, an individual block or object within a resource may be deleted.

D. Function Block—Mapping

For implementation of a function block application 440, the function block application 440 is mapped into the virtual field device of the fieldbus message specification 230, as shown in FIG. 7. The virtual field objects which are the preferred tools in describing a function block application 440 are: variable objects; event management objects; domain objects; and program invocation objects.

Variable objects are a type of block parameter. Other types of block parameters are simple, array, or record. Record objects support trend, action, and link objects. Grouping of information for access may be done using variable list objects.

Event notification objects are used for alarm and event notification. Domain objects are a computer program that may be loaded into memory using the domain download services. Program invocation services may control function block application initialization. Such services include: to start, to stop, and to reset.

The table below is used to show how the function block application model may be mapped directly into the objects defined in the object dictionary.

| Function Block Model | | Mapping to FMS | |
|---|---|---|---|
| Resource | | VFD | |
| Directory | | Directory Object | Array |
| Block | | Record | |
| | Parameters | | Simple Variables, Array & Records |
| | Views | | Variable Lists |
| Link Object | | Record | |
| Alert Object | | Event | |
| Trend Object | | Record | |

| Function Block Model | Mapping to FMS |
|---|---|
| Program Invocation | Program Invocation |
| Domain | Domain |
| Action | Record |

In a preferred embodiment, to coordinate the mapping of the function block models into the object dictionary, the device description language (described in more detail later) is used to describe the function block and support block parameters used by the configuration tool. Such a description is known as a "device description." In many cases, the "device description" is used in the configuration and interface stations. However in some cases, all or part of the device description may be stored in the field device. When the device description is stored in the field device, it may reside in its own object dictionary in a resource separate from that used for the function block application. To access the device description information, each block maintains an associated device description reference number.

The virtual field device collects the blocks and objects discussed above into an object dictionary. Within the object dictionary, each block or object is addressed by an index number and identified by an object description. The object descriptions generally contain an index, object code, further object attributes, and system-specific references to the real object.

1. Index Numbers

Figure 10:
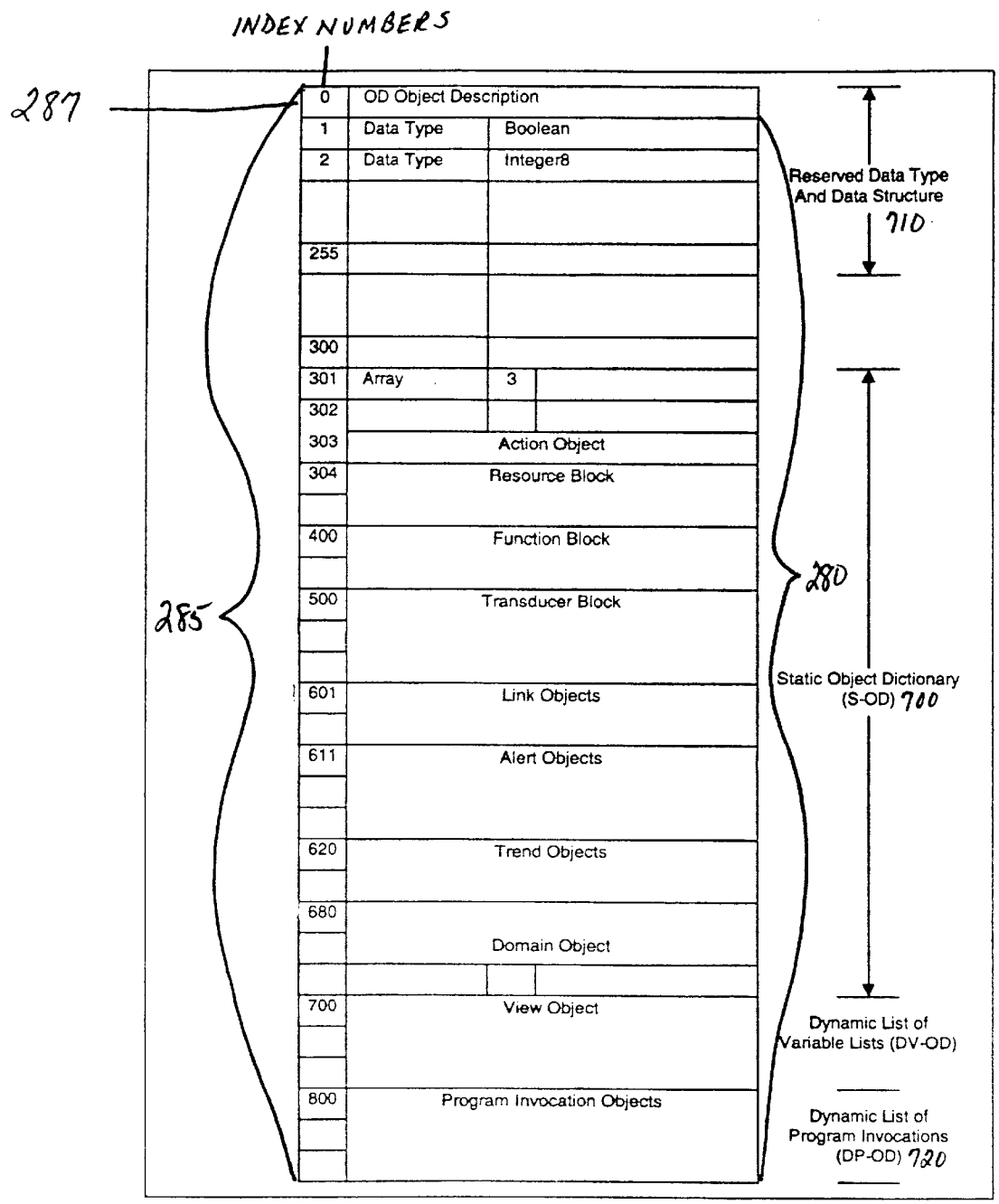
FIG. 10 illustrates the preferred layout of a object dictionary directory object.

In the preferred embodiment, the index numbers are grouped according to their data type or structure, or whether the object is static or dynamic. In the preferred embodiment, object indices 1–255 are reserved for commonly used data types and data structures. As shown in the table below, indices 1–14 and 21 are defined data types in the fieldbus message specification 230, and indices 64–86 are commonly used data structures, which are referenced in the definition of record objects. These indices are the same as the index numbers 285 shown in FIG. 6. FIG. 10 illustrates how these index numbers can also be grouped by whether the object is static or dynamic.

| Index | Type | Nam |
|---|---|---|
| 1 | Data | Boolean |
| 2 | Data | Integer 8 |
| 3 | Data | Integer 16 |
| 4 | Data | Integer 32 |
| 5 | Data | Unsigned 8 |
| 6 | Data | Unsigned 16 |
| 7 | Data | Unsigned 32 |
| 8 | Data | Floating Point |
| 9 | Data | Visible String |
| 10 | Data | Octet String |
| 11 | Data | Date |
| 12 | Data | Time of Day |
| 13 | Data | Time Difference |
| 14 | Data | Bit String |
| 21 | Data | Time Value |
| 64 | Structure | Block |
| 65 | Structure | Value & Status - Float |
| 66 | Structure | Value & Status - Discrete |
| 67 | Structure | Value & Status - BitString |
| 68 | Structure | Scaling |
| 69 | Structure | Mode |
| 70 | Structure | Access Permissions |
| 71 | Structure | Alarm -Float |
| 72 | Structure | Alarm-Discrete |
| 73 | Structure | Event-Update |
| 74 | Structure | Alarm-Summary |
| 75 | Structure | Alert-Analog |
| 76 | Structure | Alert-Discrete |
| 77 | Structure | Alert-Update |
| 78 | Structure | Trend-Float |
| 79 | Structure | Trend-Discrete |
| 80 | Structure | Trend-BitString |
| 81 | Structure | FB Link |
| 82 | Structure | Simulate-Float |
| 83 | Structure | Simulate-Discrete |
| 84 | Structure | Simulate-BitString |
| 85 | Structure | Test |
| 86 | Structure | Action-Instantiate/Delete |

All the object descriptions in the object dictionary other than the data type and data structure descriptions may support extensions. For example, the index number of an object description other than a data type or structure may be changed without effecting the other objects. In addition, the object description may also be improved or upgraded without effecting the other objects.

2. Object Dictionary

The object dictionary is defined to act as a guide to the information within a function block application 440. The object dictionary 281 is a list of references to the objects making up that function block application. This information may be read by an interface device desiring to access objects in the object dictionary.

The object dictionary directory object 282 will be defined as the first index in the static object dictionary (S-OD) 700, shown in FIG. 10. The starting point of the static object dictionary is defined by the object dictionary object description, which resides in Index Zero. In addition, the object dictionary description identifies the start index, the length of the dynamic list of variable list (DV-OD) 710 and the dynamic list of program invocation (DP-OD) 720 associated with view objects and program invocation objects.

In the preferred embodiment, the directory is logically constructed by concatenating the directory objects, and consists of a header followed by the directory entries. An array offset is specified from the start of the logical directory. The logical directory can be thought of as a single array composed of all the directory object instances. The header is only present in the first directory object.

The blocks which reside in a resource are identified in the object dictionary by the directory object. Each instance of a resource block 510, function block 530, or transducer block 520 consists of a block object and associated parameters. The block object references its associated view object 565.

The block object is the primary key used in referencing an instance of a block. It identifies the block tag, execution time, profile, and number of block parameters. Also, it identifies the starting location and number of view objects for this block. The parameters of a block are located continuously in the object dictionary following the block object. The block parameter values may be accessed through these parameter objects. In a preferred embodiment, the block parameter objects are generally restricted to simple variable parameters, array parameters and record parameters.

In the preferred embodiment, several data structures have been standardized for the function block application process.

E. Common Sub-Functions

This section contains descriptions of subfunctions common to many blocks. A process control function has the following elements: (1) one or more inputs; (2) one or more outputs; (3) scaling information; (4) a mode selector; (5) a selected algorithm; (6) as set of visible data parameters; and (7) a set of internal data. Each of these elements represents either static data or dynamic data. Static data is data which is seldom changed, while dynamic data may change with each block evaluation.

Each instance of a block is processed according to the algorithm selection at a time determined by a combined block execution and communication scheduler. The only scheduling information contained in the parameters of a block is the period of execution and the maximum execution time.

1. Connections

A block input contains the data read from outputs of other blocks. If a block does not receive an input from another block, a constant input can be entered. The permanence of the value depends on the kind of memory to store it. The type of memory used depends on the parameters. For example, volatile memory is sufficient for a frequently changing parameter. Nonvolatile memory is preferred for setpoints. Block outputs contain the result of block evaluation, or an operator entry if the mode is manual.

Both inputs and outputs comprise a value field and a status field. The status field contains quality, substatus, and limit attributes. It is the same for all inputs and outputs.

The input and output function block classes must exchange data with the device hardware and this is completely under the control of the manufacturer who writes the device code, as this data never goes through the communication system. In the alternative embodiments, many blocks provide parameters which may be written and read by remote devices operating a proprietary control application. To conduct such an exchange, the remote device must execute a handshaking utilization algorithm before writing or the block may ignore the input.

2. Simulation

In the preferred embodiment, all input and output class function blocks have a simulation parameter, which has a pair of status values, and an enable switch. This parameter acts as a switch at the interface between a function block and the associated transducer block or hardware channel. For inputs, the transducer value and status are received from the transducer block or hardware channel if the switch is disabled. When the enable switch is on, the simulation parameter and status values are received from the function block, and the transducer block or input channel is ignored.

For outputs, the simulate value and the status value become the readback value and status when the enable switch is on, and the transducer switch is ignored.

Scaling information is used for two purposes. Display devices use the range for bar graphs and trending. Control blocks use the range as percent of span, so that the tuning constant remain dimensionless.

3. Modes

In the preferred embodiment, all blocks have a mode parameter which determines the resource of the data to be used for the block's input and output. All blocks must permit the out-of-service (O/S) mode. To be useful, a block must support at least one other mode.

The permitted modes apply to the target mode. A write request to the target mode is rejected if it does not match the permitted list. A configuration device must not allow a mode to be permitted that is not supported. The actual mode is not constrained by the permitted mode, because some modes are acquired for initialization.

4. Parameter Access Table

In the preferred embodiment, there is an access table for each block. The purpose of that table is to define the relative position of the parameters within each block, and to define the contents of the standard views of the parameters.

The block parameters which need to be communicated over the bus vary within the application. To allow communications among the various function blocks, predefined sets of variables are selected for each function block. The parameters included in these predefined sets of function blocks are specified in the views in the parameter access table. If parameters are added to a block, these parameters are added after all the standard parameters.

The parameter access table provides the following: (1) the order in which the parameters appear sequentially in the object dictionary relative to the location of the associated block object; (2) a list of parameters associated with the function block address in the table; and (3) predefined parameter sets. The predefined parameter sets include view 1 through view 4.

View 1 is the operation dynamic parameter set. The operation dynamic parameter set includes information required by a plant operator to view process control, see alarm conditions, and adjust operating targets.

View 2 is the operation static parameter set. The operation static parameter set includes information which may be required for display to an operator with dynamic information. This information is read once when the associated display is first caught up, and refreshed if the static update code changes.

View 3 is the all dynamic parameter set. The all dynamic parameter set includes information which is changing in value and may need to be referenced in a detailed display.

View 4 is the static parameter set. The static parameter set includes information which is normally referenced during the configuration or maintenance and has a specific value unless changed by an operator or instrument technician.

The parameters associated with each block are listed in separate access tables. The first six indices are identical, which forms a standard header for all standard and extended function blocks. The remaining indices are for the core parameters of the function and the lesser used parameters. Finally, there are the parameters required for alarm processing, followed by the alarm records.

5. Other Common Sub-functions

In addition to the common functions discussed above, there are many others. In the preferred embodiment, these other subfunctions include: status; back calculation (BKCAL); cascade (CAS); output tracking (TRK); balancing bias or ratio (BIAS or SP); fail safe handling (FSAFE); bad cascade status handling; invalid values; parameters; alarms; and initialization and restart.

F. Preferred Resource Components

As discussed above, a device includes one or more function block applications 440. A function block application 440 includes one or more resources 500, and a resource 500 includes one or more blocks/objects. Each resource has a resource block.

In the preferred embodiment, each resource block contains data that is specific to the hardware that is associated with the resource. The data in the resource block is modeled as contained parameters, so there are no links to this block.

Each function block application also contains at least one function block. In the preferred embodiment, there are ten function blocks which, when combined, can provide the vast majority of functions for manufacturing equipment on a process control system. These blocks are: analog input; analog output; bias; control selector; discrete input; discrete output; manual loader; proportional/derivative; proportional/integral/derivative; and ratio. The definition of these blocks, including their schematics and parameter access table, is in Appendix C-Basic Function Blocks. Appendix C includes schematic drawings and the parameter access table for each of the ten basic function blocks defined in the preferred embodiment.

The details of the individual block parameters related to the function blocks are provided in Appendix D-Parameter Tables. The three tables used to describe the details of individual block parameters are: the Parameter Attributes Table, the Parameter Description Table, and the Block Option Table. Each of these tables is provided in Appendix D.

In addition, in the preferred embodiment, there are nineteen standardized function blocks to perform more complex functions, including advanced control blocks, calculation blocks, and auxiliary blocks. These nineteen function blocks are: pulse input; complex analog output; complex discrete output; step output proportional/integral/derivative; device control; setpoint ramp generator; splitter; input selector; signal characterizer; lead lag; deadtime; arithmetic; calculate; integrator; timer; analog alarm; discrete alarm; analog human interface; and discrete human interface. These blocks address additional requirements for both a low and high speed fieldbus. The schematics and parameter access tables for these blocks are provided in Appendix E-Function Block Application Processess-Part 3.

In the preferred embodiment, there are also standard transducer blocks. The specification for the preferred transducer blocks are in Appendix F-Specification Transducer Block.

Figure 11:
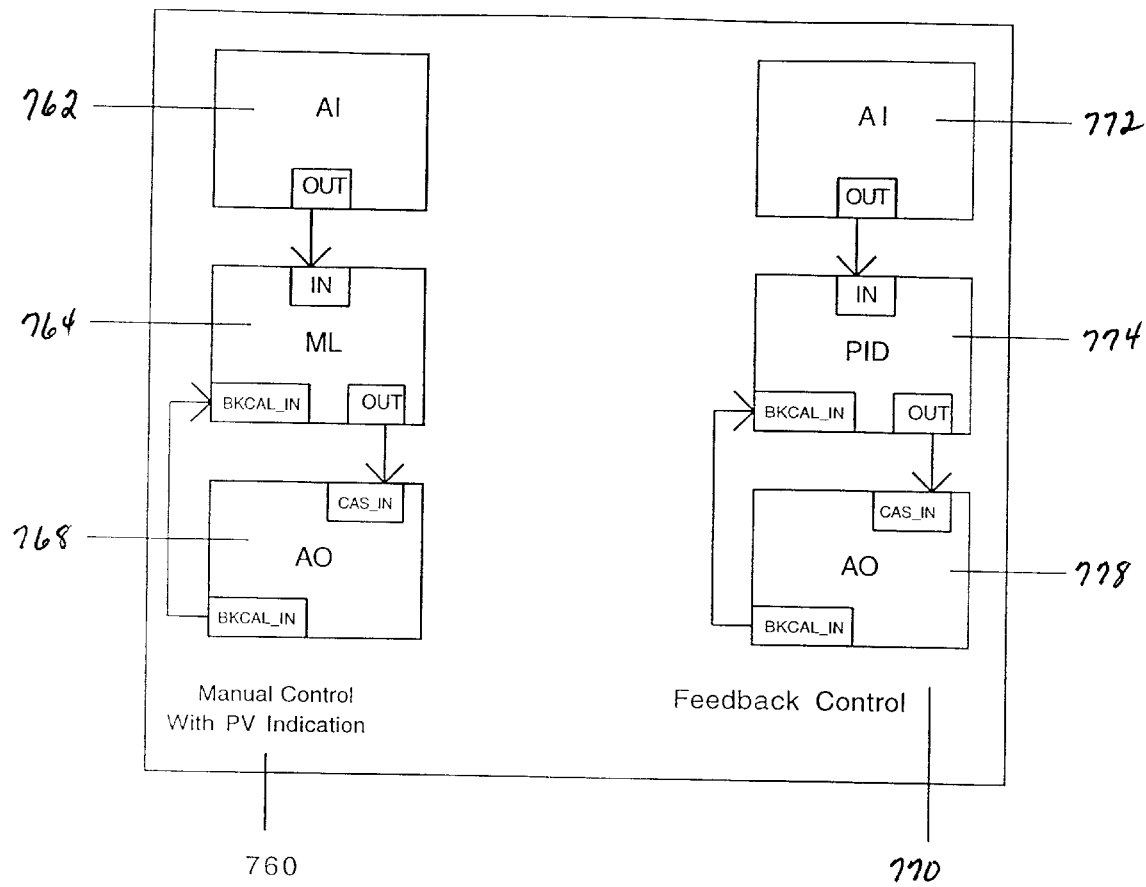
FIG. 11 illustrates examples of parameters interconnected for a single loop.

Examples of two target applications, a manual control 760 and a feedback control 770, using the basic function blocks are shown in FIGS. 11. The manual control 760 consist of an analog input function block 762, a manual loader 764, and an analog output function block 768. The feedback control 770 consists of an analog input 772, a proportional/integral/derivative 774, and an analog output 778.

G. Device Descriptions (DD)

Figure 12:
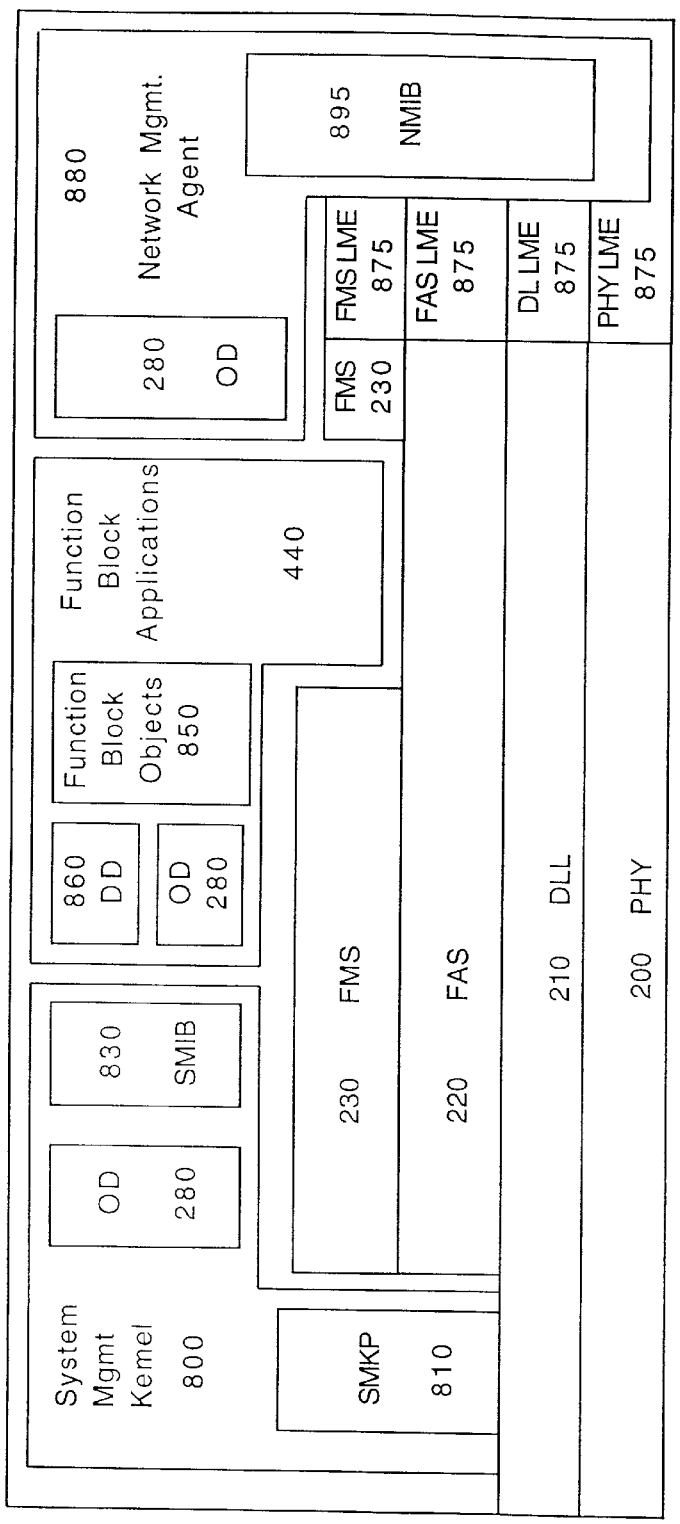
FIG. 12 illustrates the preferred system architecture of the present invention.

As shown in FIG. 12, the function block application processes may also store device descriptions (DD) 860. To extend the network's interoperability, the device descriptions 860 are used in addition to the standard function block parameters. The device descriptions 860 extend the descriptions of each object in the virtual field device.

The device descriptions 860 provide information needed for a control system to interpret the meaning of the data in the virtual field device, including the human interface functions, such as calibration and diagnostics.

The device description can be written in any standardized programming language, such as C, C++, or SmallTalk. In the preferred embodiment, these descriptions are written in the device description language described in Appendix G-Device Description Language Specification.

IV. SYSTEM MANAGEMENT

In operation, function blocks must execute in precisely defined intervals and in proper sequence for correct control system operation. System management synchronizes execution of the function blocks and a communication of function block parameters on the bus. System management also handles other important features such as publication of the time of day to all devices, automatic assignment of device addresses, and searching for parameter names or tags on the fieldbus.

The configuration information needed by the system management, such as the system schedule, is described by object descriptions. The configuration information is stored in the network and system management virtual field device 310, as shown in FIG. 7. The network and system management virtual field device 310 provides access to the system management information base (SMIB) 330, and also to the network management information base (NMIB) 320. The system schedules can be inputted manually or built using a schedule building tool. A schedule building tool is used to generate a function block and link active scheduler schedules is used to generate system and network schedules.

Based on the system schedule, system management controls when the function blocks execute. This insures that each function block executes at the appropriate time in relationship to other function blocks in the system. For a true distributed control system, the activities of the devices and their function blocks also have to be synchronized with those of other devices on the network. The coordination of the execution of blocks in different devices is controlled by a network manager using a network schedule. Network Management is described in detail later.

The system and network schedules contain the start time off-set from the beginning of the absolute link schedule start time. The absolute link schedule start time is known by all devices on the fieldbus.

The system management also has a time publisher which, in a link active scheduler 100, periodically sends an application clock synchronization to all field devices. The data link scheduling time is sampled and sent with the application clock message so that the receiving devices can adjust their local application time. Between synchronization messages, the application or system clock time is independently maintained in each field device based on its own system clock. The system clock in each field device initiates the execution of the system schedule for that device, not the data link clock, unless the field device is the link active scheduler 100. System clock synchronization allows the field devices to stamp data throughout a network. If there are backup system clock publishers on the bus, a backup publisher will become the data link clock if the currently active time publisher should fail.

System management also automatically assigns unique network addresses to each field device. Every field device, except a temporary device, should have a unique network address and physical tag. Temporary devices are not assigned tags or permanent addresses. Temporary devices simply join the network at one of four data link visitor addresses reserved for them in the data link layer protocol specification.

The system management function responsible for tag and data link address, assignment is referred to as the configuration master. It is normally co-located with the link active scheduler 100, although it is not required to be, so it can monitor the live list for the addition of new devices. When a device is added at a default network address, configuration master verifies that a system management kernel for the field device does not have a physical tag and assigns it one using system management kernel protocol 810. Once assigned, the system management kernel moves to the initialized state. In this state, it is ready to be assigned a network address on the operational network. A system management kernel is described in detail later.

The sequence for assigning a network address to a new field device is as follows: (1) a physical tag is assigned to a new device via configuration device; (2) system management asks the field device for its physical device tag default network address; (3) system management uses the physical device tag to look up the new network address in the configuration table; and (4) system management sends a special set-address message to the device which forces the device to assume the network address. The sequence of these steps is repeated for all devices that enter the network at a default address.

FIG. 12 shows the relationship between system management and the other communication and application components of the present invention. For example, FIG. 12 shows the relationships between the system management and function block application 440, function block objects 850, device descriptions (DD) 860, and object descriptions (OD) 280. System management also uses the fieldbus message specification 230 to remotely access management information within a field device. System management also accesses the data link layer 210 to perform its other functions.

A single system management entity exists in each link master 105 or link active scheduler 100. This entity comprises a system management information base 830 (SMIB), an object dictionary 280, and a system management kernel 800.

The system management kernel 800 provides a network coordinated and synchronized set of functions. To enforce the coordination and synchronization of these functions across the network, a manager/agent model is used. In the preferred embodiment, the system management kernel 800 assumes the role of an agent and responds to the instructions received from the system management. A system management protocol is used to define communications between managers and agents.

Information which is used to control system management operation is organized as objects stored in the SMIB 830. The SMIB 830 is accessed by the network through the system and network management virtual field device 310. The SMIB 830 contains configuration and operational parameters for a device. Examples of the objects included in the SMIB 830 are: device identification, physical device tag, list of virtual field devices, time object, schedule object, and configuration status.

The system management allows SMIB objects to be accessed using the fieldbus message specification application services, such as read, write, etc. Access to the SMIB allows remote applications to obtain management information from the device, either before or during network operation. The management virtual field device is shared with the network management agent 880 of the device and thereby also provides access to network management agent objects.

V. NETWORK MANAGEMENT

FIG. 12 shows the architectural relationship between network management and the other communication and application components in a device. Each device contains a single network management agent 880 and layer management entities (LME) 875 for its protocols. Each network has at least one network manager which coordinates the network management of the whole system. Network management provides the capabilities of: loading a virtual communication relationship list; configuring the communication stack 205; loading the network schedule; performance monitoring; and fault detection monitoring.

The network manager is responsible for maintaining the operation of the network according to the policies defined for it by the system manager. The network manager enforces the system management policies by monitoring the status of the communication stack 205 in each device, and taking action when necessary. The network manager performs these tasks by processing information and reports produced by network management agents 880, and recommending agents to perform services requested via the fieldbus message specification 230.

The network management agent 880 is responsible for providing the network manager with a fieldbus message specification 230 interface to manage objects of the communication stack 205. Internal to the device, the network management agent 880 maps fieldbus message specification service requests to objects that it maintains for the communication stack 205 as a whole, an objects maintained by the LMEs.

The LMEs 875 provide management capability of a layer protocol, such as the physical layer (PHY) 200, the data link layer (DLL) 210, fieldbus access sublayer (FAS) 220 or fieldbus message specification (FMS) 230. The LMEs 875 provide the network management agent 880 with a local interface to the managed objects of the protocol. All network access to the LMEs and their objects is provided by the network management agent 880.

The NMIB 895 contains the NMIBs 320 in the system and network management virtual field device (VFD) 310. The NMIB also contains objects used to define configuration management, performance management and fault management. The objects are accessed by network managers using fieldbus message specifications services. The objects used for network management objects are designed similar to the function blocks described earlier.

The preferred embodiments set forth above are to illustrate the invention and are not intended to limit the present invention. Additional embodiments and advantages within the scope of the claimed invention will be apparent to one of ordinary skill in the art.

We claim:

1. An apparatus for operating in an open control system comprising:
   a memory, which includes system management data and a function block;
   wherein the system management data includes a system schedule;
   wherein the function block includes parameters and a computer program;
   a processor, operably connected to the memory, wherein the processor executes the function block based on the system schedule; and
   a medium attachment unit, which translates input messages and output messages between the processor and a transmission medium.

2. The apparatus of claim 1, wherein the memory further contains network management data including a network schedule; and wherein the processor initiates a list of network activities according to the network schedule.

3. The apparatus of claim 2 wherein the network management data includes a list of active devices, and wherein the processor updates the list of active devices.

4. The apparatus of claim 3 wherein the processor updates the list of active devices by adding a new device to the list of active devices.

5. The apparatus of claim 1 wherein the medium attachment unit is in the processor.

6. The apparatus of claim 1 wherein the memory is in the processor.

7. The apparatus of claim 1 wherein the function block includes at least one device description.

8. The apparatus of claim 1 wherein the memory is selected from the group consisting of a floppy disk, hard drive and CD ROM.

9. The apparatus of claim 1 wherein a plurality of devices are electrically coupled to the transmission medium, the system management data includes a device tag, and the processor automatically assigns the device tag to one of the plurality of devices.

10. The apparatus of claim 1 wherein the processor maintains a system time, and wherein the system time is periodically published on the transmission medium.

11. The apparatus of claim 1 wherein the system management data further includes a schedule building tool and wherein the processor builds a system schedule with the schedule building tool.

12. The apparatus of claim 2 wherein the system management data further includes a schedule building tool and wherein the processor builds a network schedule with the schedule building tool.

13. The apparatus of claim 1 wherein the system management includes a plurality of function blocks and wherein at least one of the function blocks receives analog input data and makes the analog input data readable to another one of the plurality of function blocks as an output.

14. The apparatus of claim 1 wherein the system management includes a plurality of function blocks and wherein at least one of the plurality of function blocks receives discrete input data and makes the discrete input data electronically readable to another one of the plurality of function blocks as an output.

15. The apparatus of claim 1 wherein the memory stores a plurality of function blocks and wherein at least two of the plurality of function blocks are connected in series.

16. The apparatus of claim 15 wherein the processor controls the execution of the plurality of function blocks according to the system schedule.

17. The apparatus of claim 1 wherein the apparatus is operably connected to a digital bus.

18. The apparatus of claim 1 wherein the system management data also includes an object dictionary and the object dictionary lists parameters of the apparatus by index number.

19. The apparatus of claim 18 wherein the object dictionary includes object descriptions and the object descriptions are written in the device description language.

20. The apparatus of claim 18 wherein the object dictionary includes object descriptions and the object descriptions contain information which describes data types and structures.

21. The apparatus of claim 1 wherein the function block has an input and output and the memory further includes:
   a resource block, a first transducer block, and a second transducer block, wherein the resource block insulates the function block from physical hardware, the first transducer block decouples the input to the function block, and the second transducer decouples the output of the function block.

22. The apparatus of claim 21 wherein the memory stores a plurality of functions blocks and the processor executes the plurality of function blocks.

23. The apparatus of claim 1 wherein the memory further stores a plurality of function blocks and at least one object selected from the group consisting of link objects, trend objects, alert objects, and view objects.

24. The apparatus of claim 23 wherein a resource is defined by the plurality of function blocks and at least one object.

25. The apparatus of claim 24 wherein the apparatus includes a plurality of resources.

26. The apparatus of claim 1, wherein the processor receives input parameters, and further comprising an input snap which protects the input parameters from external interference.

27. The apparatus of claim 26 wherein the processor outputs output parameters, and further comprises an output snap for protecting the output parameters from internal interference.

28. A system for permitting interoperability between devices comprising:
   a plurality of devices, each device including a resource block and a function block;
   wherein the resource blocks uniquely identify each device and the function block processes parameters to produce an output message; and
   a medium attachment unit, operably connected to the function block, wherein the medium attachment unit translates an input message from a transmission medium to the function block and the output message from the function block to the transmission medium.

29. The system of claim 28 wherein each device includes a memory containing a system schedule, and wherein each function block is executed according to the system schedule.

30. The system of claim 29 wherein each device further includes a system time, and one of the system times acts as a network time.

31. The system of claim 30 wherein one of the system times is a network time, and the network time is periodically published on the transmission medium to synchronize each system time with the network time.

32. A method for providing an open control system which allows the removal of the network controller without affecting interoperability between devices, the method comprising the steps of:
   providing a network controller, which controls a plurality of devices operating on a transmission medium, the network controller comprising:
      a first memory, which includes a network schedule; and
      a first processor, operably connected to the first memory, wherein the first processor controls activities on the transmission medium according to the network schedule;
   providing a device, operably connected to the network controller with the transmission medium, wherein the device comprises:
      a second memory, which includes a system schedule; and
      a second processor, operably connected to the second memory, wherein the second processor receives instructions from the first processor and is capable of controlling activities on the transmission medium according to the system schedule; and
   shifting the responsibility of controlling activities on the transmission medium to the device.

33. The method of claim 32 further comprising the step of evaluating bids to assume the responsibility of controlling activities on the transmission medium.

34. An apparatus for enhancing interoperability of a control system, the apparatus comprising:
   means for storing at least one encapsulated function block, which includes contained parameters and a computer program;
   means, coupled to the storing means, for processing the function block using the contained parameters, wherein the processing of the contained parameters produces an output parameter; and means, coupled to the processing means, for translating messages from the processor for transmission on a transmission medium.

35. The apparatus of claim 34 wherein the storing means stores a system schedule and a plurality of function blocks and the processing means controls the execution of the plurality of function blocks according to the system schedule.

36. The apparatus of claim 34, wherein the storing means also stores a system schedule and the processing means processes the encapsulated function block according to the system schedule.

37. The apparatus of claim 34 wherein the storing means also stores a network schedule, wherein the processing means generates compel data messages based on the network schedule.

38. An apparatus operating in a control system, the apparatus comprising:

a user layer, which includes an encapsulated block to provide functionality;

a physical layer, which translates messages from a transmission medium into a suitable format for the user layer and from the user layer into a signal for transmission on the transmission medium; and a communication stack, connected to the user layer and the physical layer, wherein the communication stack includes a data link layer and an application layer, wherein the data link layer controls the transmission of messages onto the transmission medium and the application layer allows the user layer to communicate over the transmission medium.

39. The apparatus of claim 38 wherein the application layer includes a fieldbus message specification, which defines the communication services and message formats.

40. The apparatus of claim 38 wherein the user layer includes a plurality of blocks interconnected to perform a desired function.

41. The apparatus of claim 40 wherein the plurality of blocks include a resource block, a function block, and a transducer block.

42. The apparatus of claim 40 wherein the plurality of blocks include an alert object and a link object.

43. A memory for storing data for access by an application framework operating in a device within a control system, the memory comprising:

a data structure stored in the memory, the data structure including:

a resource block, which makes hardware specific characteristics of the device electronically readable;

an encapsulated function block, wherein the function block includes a program and parameters; and at least one transducer block, wherein the at least one transducer block controls access to the function block.

44. The memory of claim 43 wherein the data structure also includes a resource block that defines the specific attributes of a resource within the memory.

45. The memory of claim 43 wherein the data structure also includes a directory object to store a list of references to the resource block, function block and transducer block.

* * * * *